US012750108B2

(12) United States Patent
Rahman et al.

(10) Patent No.: US 12,750,108 B2
(45) Date of Patent: Sep. 29, 2026

(54) METHOD AND APPARATUS FOR CSI REPORTING

(71) Applicant: Samsung Electronics Co., Ltd., Suwon-si (KR)

(72) Inventors: Md. Saifur Rahman, Plano, TX (US); Eko Onggosanusi, Coppell, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 299 days.

(21) Appl. No.: 18/468,589

(22) Filed: Sep. 15, 2023

(65) Prior Publication Data

US 2024/0154669 A1 May 9, 2024

Related U.S. Application Data

(60) Provisional application No. 63/418,873, filed on Oct. 24, 2022, provisional application No. 63/415,125, filed on Oct. 11, 2022, provisional application No. 63/413,465, filed on Oct. 5, 2022.

(51) Int. Cl.
*H04B 7/06* (2006.01)

(52) U.S. Cl.
CPC ......... *H04B 7/0626* (2013.01); *H04B 7/0634* (2013.01)

(58) Field of Classification Search
CPC .. H04B 7/0615; H04B 7/0617; H04B 7/0619; H04B 7/0621; H04B 7/0626; H04B 7/0634; H04B 7/0413; H04B 7/0456; H04B 7/0478
See application file for complete search history.

(56) References Cited

U.S. PATENT DOCUMENTS

2022/0295499 A1 9/2022 Rahman et al.
2022/0329303 A1 10/2022 Rahman et al.
2024/0372590 A1* 11/2024 Lee ...................... H04B 7/0456
(Continued)

FOREIGN PATENT DOCUMENTS

WO 2022203442 A1 9/2022
WO WO-2024065426 A1 * 4/2024 ............ H04W 24/08
(Continued)

OTHER PUBLICATIONS

Merriam-Webster, "When: definition", Sep. 5, 2025, https://www.merriam-webster.com/dictionary/when (Year: 2025).*
(Continued)

*Primary Examiner* — Paul H. Masur

(57) ABSTRACT

Methods and apparatuses for channel state information (CSI) reporting in a wireless communication system. A method for operating a user equipment (UE) includes receiving a configuration about a CSI report, the configuration including a value of $N_4$ and a codebookType. The method further includes, based on the configuration: determining, based on a condition, whether the CSI report includes an indicator indicating Q time domain (TD)/Doppler domain (DD) basis vectors and when the condition is met, determining the Q TD/DD basis vectors, each of length $N_4$. The method further includes transmitting the CSI report including the indicator indicating the Q TD/DD basis vectors when the condition is met.

12 Claims, 12 Drawing Sheets

(56) References Cited

U.S. PATENT DOCUMENTS

| | | | | |
|---|---|---|---|---|
| 2025/0300709 | A1* | 9/2025 | Huang | H04B 7/0456 |
| 2025/0392362 | A1* | 12/2025 | Gao | H04B 7/0626 |
| 2026/0019121 | A1* | 1/2026 | Wu | H04B 7/0626 |
| 2026/0081649 | A1* | 3/2026 | Athley | H04B 7/0456 |
| 2026/0088878 | A1* | 3/2026 | Gao | H04B 7/0632 |

FOREIGN PATENT DOCUMENTS

| | | | | |
|---|---|---|---|---|
| WO | WO-2024069753 A1 * | 4/2024 | | H04B 7/0456 |
| WO | 2024232609 A1 | 11/2024 | | |
| WO | WO-2025032650 A1 * | 2/2025 | | H04W 24/10 |
| WO | WO-2025032651 A1 * | 2/2025 | | H04W 24/10 |
| WO | WO-2025032652 A1 * | 2/2025 | | H04W 24/10 |

OTHER PUBLICATIONS

Machine Translation of WO-2024065426-A1 (Year: 2024).*
Machine Translation of WO-2024069753-A1 (Year: 2024).*
Machine Translation of WO-2025032650-A1 (Year: 2025).*
Machine Translation of WO-2025032651-A1 (Year: 2025).*
Machine Translation of WO-2025032652-A1 (Year: 2025).*
Ramireddy et al., "Enhancements on Type-II 5G New Radio Codebooks for UE Mobility Scenarios", Apr. 25, 2022, IEEE Communications Standards Magazine (vol. 6, Issue: 1, Mar. 2022), DOI: 10.1109/MCOMSTD.0001.2100072, pp. 35-40 (Year: 2022).*
Lee et al., "CSI Feedback for Distributed MIMO", Apr. 10-13, 2022, 2022 IEEE Wireless Communications and Networking Conference (WCNC), DOI: 10.1109/WCNC51071.2022.9771853, pp. 2154-2159 (Year: 2022).*
"3rd Generation Partnership Project; Technical Specification Group Radio Access Network; Evolved Universal Terrestrial Radio Access (E-UTRA); Physical channels and modulation (Release 17)," 3GPP TS 36.211 V17.0.0, Dec. 2021, 250 pages.
"3rd Generation Partnership Project; Technical Specification Group Radio Access Network; Evolved Universal Terrestrial Radio Access (E-UTRA); Multiplexing and channel coding (Release 17)," 3GPP TS 36.212 V17.0.0, Dec. 2021, 258 pages.
"3rd Generation Partnership Project; Technical Specification Group Radio Access Network; Evolved Universal Terrestrial Radio Access (E-UTRA); Physical layer procedures (Release 17)," 3GPP TS 36.213 V17.0.0, Dec. 2021, 582 pages.
"3rd Generation Partnership Project; Technical Specification Group Radio Access Network; Evolved Universal Terrestrial Radio Access (E-UTRA); Medium Access Control (MAC) protocol specification (Release 17)," 3GPP TS 36.321 V17.0.0, Mar. 2022, 146 pages.
"3rd Generation Partnership Project; Technical Specification Group Radio Access Network; Evolved Universal Terrestrial Radio Access (E-UTRA); Radio Resource Control (RRC); Protocol specification (Release 17)," 3GPP TS 36.331 V17.0.0, Mar. 2022, 1119 pages.
"3rd Generation Partnership Project; Technical Specification Group Radio Access Network; NR; Physical channels and modulation (Release 17)," 3GPP TS 38.211 V17.0.0, Dec. 2021, 134 pages.
"3rd Generation Partnership Project; Technical Specification Group Radio Access Network; NR; Multiplexing and channel coding (Release 17)," 3GPP TS 38.212 V17.0.0, Dec. 2021, 190 pages.
"3rd Generation Partnership Project; Technical Specification Group Radio Access Network; NR; Physical layer procedures for data (Release 17)," 3GPP TS 38.214 V17.0.0, Dec. 2021, 217 pages.
"3rd Generation Partnership Project; Technical Specification Group Services and System Aspects; Feasibility Study on New Services and Markets Technology Enablers; Stage 1 (Release 14)," 3GPP TR 22.891 V1.2.0, Nov. 2015, 96 pages.
"Measurement results on Doppler spectrum for various UE mobility environments and related CSI enhancements," Fraunhofer IIS, Fraunhofer HHI, Deutsche Telekom, 3GPP TSG RAN WG#86, RP-192978, Sitges, Spain, Dec. 9-12, 2019, 13 pages.
International Search Report and Written Opinion issued Jan. 18, 2024 regarding International Application No. PCT/KR2023/015354, 6 pages.
Fraunhofer Iis et al., "CSI enhancements for medium UE velocities and coherent JT", 3GPP TSG RAN WG1 Meeting #110, R1-2206974, Aug. 2022, 13 pages.
Lenovo, "CSI enhancements for high mobility and coherent JT", 3GPP TSG RAN WG1 Meeting #110, R1-2206211, Aug. 2022, 20 pages.
Moderator (Samsung), "Moderator Summary on Rel-18 CSI enhancements", 3GPP TSG RAN WG1 Meeting #110, R1-2206812, Aug. 2022, 42 pages.
Mediatek Inc., "CSI enhancement for high/medium UE velocities and coherent JT", 3GPP TSG RAN WG1 Meeting #110, R1-2206992, Aug. 2022, 22 pages.
Extended European Search Report issued Nov. 18, 2025 regarding Application No. 23875241.4, 15 pages.
Xiaomi, "Views on CSI enhancement for high/medium UE velocities and CJT", 3GPP TSG RAN WG1 #111, R1-2211336, Nov. 2022, 15 pages.
ZTE, "CSI enhancement for high/medium UE velocities and CJT", 3GPP TSG RAN WG1 Meeting #110, R1-2205920, Aug. 2022, 24 pages.

* cited by examiner

METHOD AND APPARATUS FOR CSI REPORTING

CROSS-REFERENCE TO RELATED APPLICATIONS AND CLAIM OF PRIORITY

The present application claims priority to:

U.S. Provisional Patent Application No. 63/413,465, filed on Oct. 5, 2022;

U.S. Provisional Patent Application No. 63/415,125, filed on Oct. 11, 2022; and

U.S. Provisional Patent Application No. 63/418,873, filed on Oct. 24, 2022. The contents of the above-identified patent documents are incorporated herein by reference.

TECHNICAL FIELD

The present disclosure relates generally to wireless communication systems and, more specifically, the present disclosure relates to a channel state information (CSI) reporting in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to a CSI reporting in a wireless communication system.

In one embodiment, a user equipment (UE) is provided. The UE includes a transceiver configured to receive a configuration about a CSI report, the configuration including a value of $N_4$ and a codebookType and a processor operably coupled to the transceiver. The processor, based on the configuration, is configured to determine, based on a condition, whether the CSI report includes an indicator indicating Q time domain (TD)/Doppler domain (DD) basis vectors, and when the condition is met, determine the Q TD/DD basis vectors, each of length $N_4$. The transceiver is further configured to transmit the CSI report including the indicator indicating the Q TD/DD basis vectors when the condition is met.

In another embodiment, a base station (BS) is provided. The BS includes a transceiver configured to transmit a configuration about a CSI report, the configuration including a value of $N_4$ and a codebookType and receive the CSI report including an indicator indicating Q TD/DD basis vectors, each of length $N_4$, when a condition is met.

In yet another embodiment, a method for operating a UE is provided. The method includes receiving a configuration about a CSI report, the configuration including a value of $N_4$ and a codebookType. The method further includes, based on the configuration: determining, based on a condition, whether the CSI report includes an indicator indicating Q TD/DD basis vectors and when the condition is met, determining the Q TD/DD basis vectors, each of length $N_4$. The method further includes transmitting the CSI report including the indicator indicating the Q TD/DD basis vectors when the condition is met.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 36.211 v17.0.0, "E-UTRA, Physical channels and modulation"; 3GPP TS 36.212 v17.0.0, "E-UTRA, Multiplexing and Channel coding"; 3GPP TS 36.213 v17.0.0, "E-UTRA, Physical Layer Procedures"; 3GPP TS 36.321 v17.0.0, "E-UTRA, Medium Access Control (MAC) protocol specification"; 3GPP TS 36.331 v17.0.0, "E-UTRA, Radio Resource Control (RRC) Protocol Specification"; 3GPP TS 38.211 v17.0.0, "NR, Physical channels and modulation"; 3GPP TS 38.212 v17.0.0, "NR, Multiplexing and Channel coding"; 3GPP TS 38.214 v17.0.0" and 3GPP TR 22.891 v1.2.0, "Feasibility Study on New Services and Markets Technology Enablers."

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive MIMO, full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems, or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Figure 1:
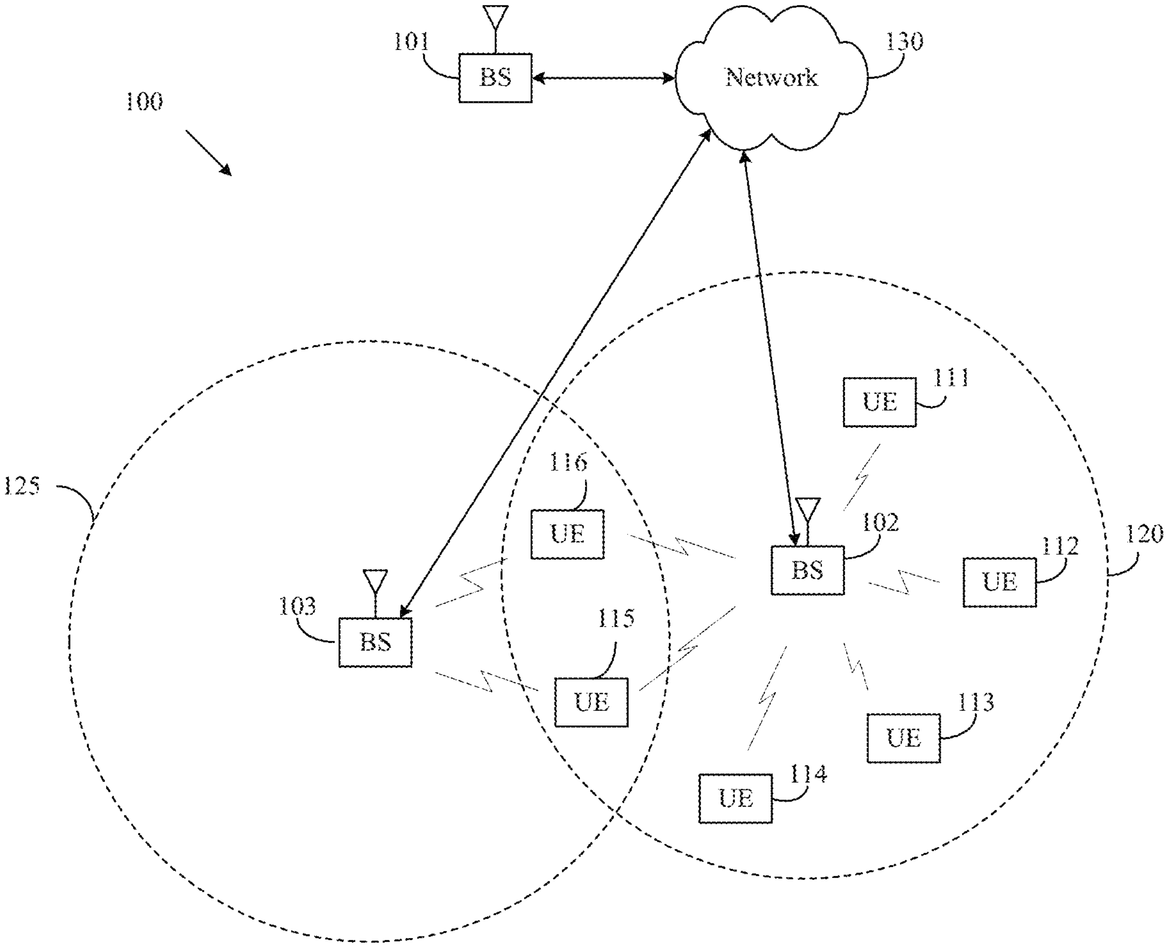
FIG. 1 illustrates an example of wireless network according to embodiments of the present disclosure.
Figure 2:
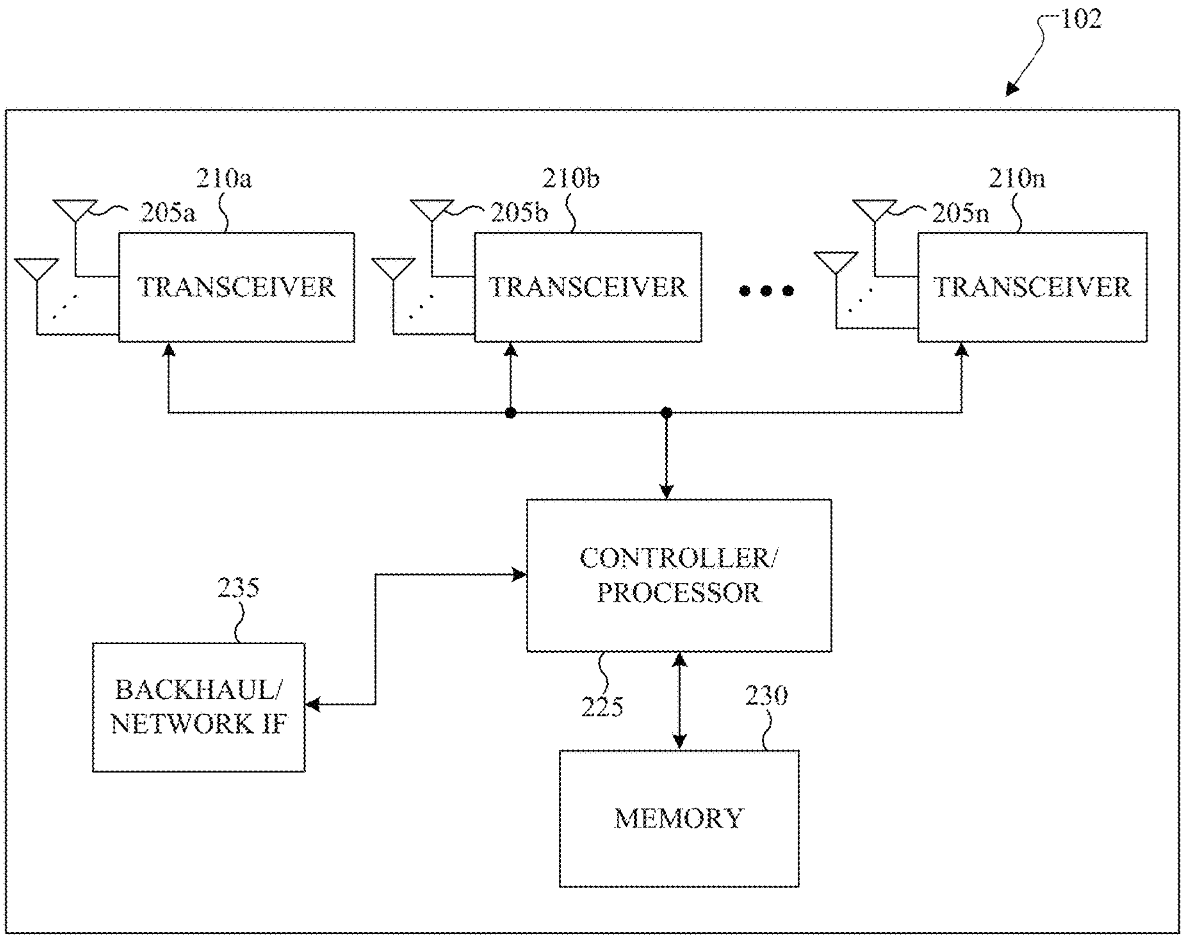
FIG. 2 illustrates an example of gNB according to embodiments of the present disclosure.
Figure 3:
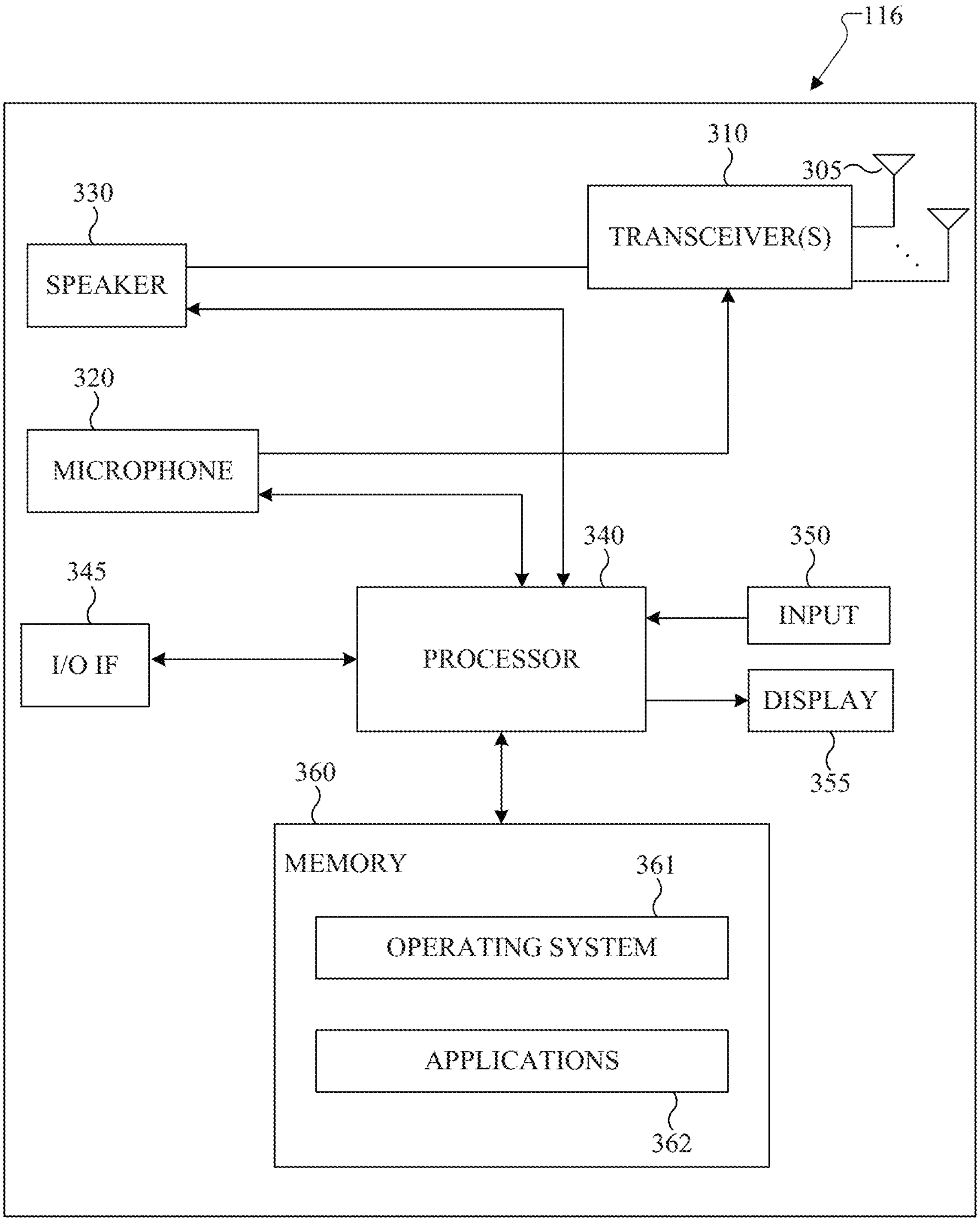
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise; a UE 113, which may be a WiFi hotspot; a UE 114, which may be located in a first residence; a UE 115, which may be located in a second residence; and a UE 116, which may be a mobile device, such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, long term evolution (LTE), long term evolution-advanced (LTE-A), WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for a CSI reporting in a wireless communication system. In certain embodiments, and one or more of the gNBs 101-103 includes circuitry, programing, or a combination thereof, to support a CSI reporting in a wireless communication system.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205*a*-205*n*, multiple transceivers 210*a*-210*n*, a controller/processor 225, a memory 230, and a backhaul or network interface 235.

The transceivers 210*a*-210*n* receive, from the antennas 205*a*-205*n*, incoming RF signals, such as signals transmitted by UEs in the network 100. The transceivers 210*a*-210*n* down-convert the incoming RF signals to generate IF or baseband signals. The IF or baseband signals are processed by receive (RX) processing circuitry in the transceivers 210*a*-210*n* and/or controller/processor 225, which generates processed baseband signals by filtering, decoding, and/or digitizing the baseband or IF signals. The controller/processor 225 may further process the baseband signals.

Transmit (TX) processing circuitry in the transceivers 210*a*-210*n* and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210*a*-210*n* up-converts the baseband or IF signals to RF signals that are transmitted via the antennas 205*a*-205*n*.

The controller/processor 225 can include one or more processors or other processing devices that control the overall operation of the gNB 102. For example, the controller/processor 225 could control the reception of UL channel signals and the transmission of DL channel signals by the transceivers 210*a*-210*n* in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205*a*-205*n* are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as processes for supporting a CSI reporting in a wireless communication system. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In some embodiments, the processor 340 includes at least one microprocessor or microcontroller.

The processor 340 is also capable of executing other processes and programs resident in the memory 360, such as processes for a CSI reporting in a wireless communication system.

The processor 340 can move data into or out of the memory 360 as required by an executing process. In some embodiments, the processor 340 is configured to execute the applications 362 based on the OS 361 or in response to signals received from gNB s or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350 and the display 355*m* which includes for example, a touchscreen, keypad, etc., The operator of the UE 116 can use the input 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). In another example, the transceiver(s) 310 may include any number of transceivers and signal processing chains and may be connected to any number of antennas. Also, while FIG. 3 illustrates the UE 116 configured as a mobile telephone or smartphone, UEs could be configured to operate as other types of mobile or stationary devices.

Figure 4:
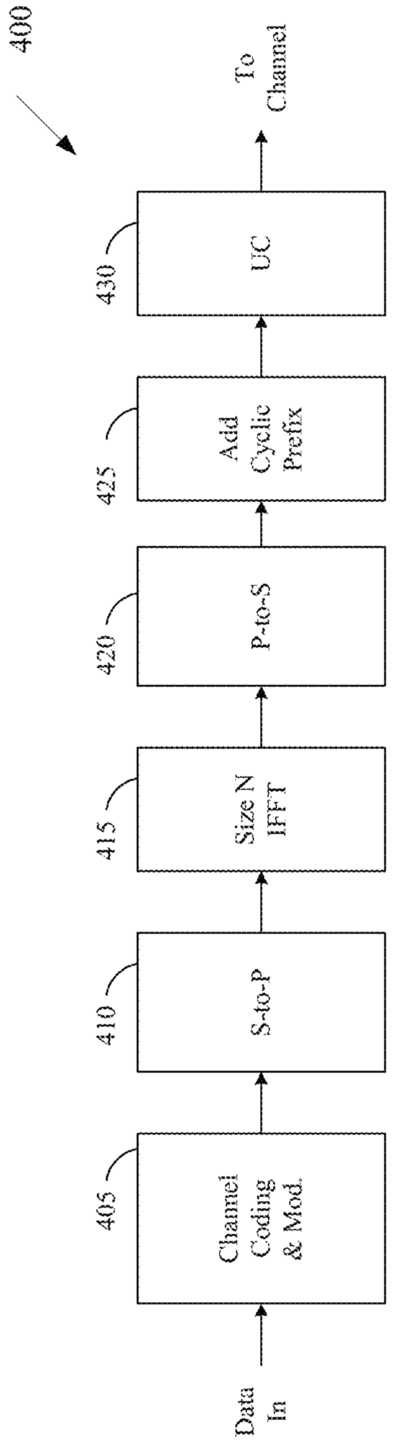
FIGS. 4 and 5 illustrate example of wireless transmit and receive paths according to this disclosure.
Figure 5:
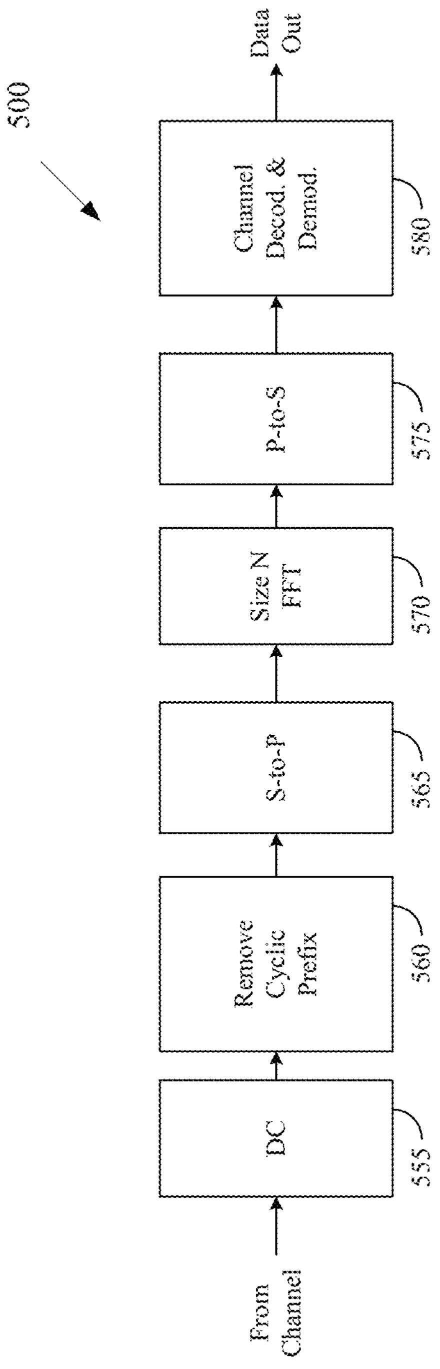

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the transmit path 400 is configured to support for a CSI reporting in a wireless communication system.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the downconverter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIGS. 4 and FIG. 5 may be implemented in software, while other components may be implemented by configurable hardware or a mixture of software and configurable hardware. For instance, the FFT block 570 and the IFFT block 415 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

A unit for DL signaling or for UL signaling on a cell is referred to as a slot and can include one or more symbols. A bandwidth (BW) unit is referred to as a resource block (RB). One RB includes a number of sub-carriers (SCs). For example, a slot can have duration of one millisecond and an RB can have a bandwidth of 180 KHz and include 12 SCs with inter-SC spacing of 15 KHz. A slot can be either full DL slot, or full UL slot, or hybrid slot similar to a special subframe in time division duplex (TDD) systems.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. A UE can be indicated a spatial setting for a PDCCH reception based on a configuration of a value for a TCI state of a CORESET where the UE receives the PDCCH. The UE can be indicated a spatial setting for a PDSCH reception based on a configuration by higher layers or based on an indication by a DCI format scheduling the PDSCH reception of a value for a TCI state. The gNB can configure the UE to receive signals on a cell within a DL bandwidth part (BWP) of the cell DL BW.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process consists of NZP CSI-RS and CSI-IM resources. A UE can determine CSI-RS transmission parameters through DL control signaling or higher layer signaling, such as an RRC signaling from a gNB. Transmission instances of a CSI-RS can be indicated by DL control signaling or configured by higher layer signaling. A DMRS is transmitted only in the BW of a respective PDCCH or PDSCH and a UE can use the DMRS to demodulate data or control information.

UL signals also include data signals conveying information content, control signals conveying UL control information (UCI), DMRS associated with data or UCI demodulation, sounding RS (SRS) enabling a gNB to perform UL channel measurement, and a random access (RA) preamble enabling a UE to perform random access. A UE transmits data information or UCI through a respective physical UL shared channel (PUSCH) or a physical UL control channel (PUCCH). A PUSCH or a PUCCH can be transmitted over a variable number of slot symbols including one slot symbol. The gNB can configure the UE to transmit signals on a cell within an UL BWP of the cell UL BW.

UCI includes hybrid automatic repeat request acknowledgement (HARQ-ACK) information, indicating correct or incorrect detection of data transport blocks (TBs) in a PDSCH, scheduling request (SR) indicating whether a UE has data in the buffer of UE, and CSI reports enabling a gNB to select appropriate parameters for PDSCH or PDCCH transmissions to a UE. HARQ-ACK information can be configured to be with a smaller granularity than per TB and can be per data code block (CB) or per group of data CBs where a data TB includes a number of data CBs.

A CSI report from a UE can include a channel quality indicator (CQI) informing a gNB of a largest modulation and coding scheme (MCS) for the UE to detect a data TB with a predetermined block error rate (BLER), such as a 10% BLER, of a precoding matrix indicator (PMI) informing a gNB how to combine signals from multiple transmitter antennas in accordance with a MIMO transmission principle, and of a rank indicator (RI) indicating a transmission rank for a PDSCH. ULRS includes DMRS and SRS. DMRS is transmitted only in a BW of a respective PUSCH or PUCCH transmission. A gNB can use a DMRS to demodulate information in a respective PUSCH or PUCCH. SRS is transmitted by a UE to provide a gNB with an UL CSI and, for a TDD system, an SRS transmission can also provide a PMI for DL transmission. Additionally, in order to establish synchronization or an initial higher layer connection with a gNB, a UE can transmit a physical random-access channel.

In the present disclosure, a beam is determined by either of: (1) a TCI state, which establishes a quasi-colocation (QCL) relationship between a source reference signal (e.g., synchronization signal/physical broadcasting channel (PBCH) block (SSB) and/or CSI-RS) and a target reference signal; or (2) spatial relation information that establishes an association to a source reference signal, such as SSB or CSI-RS or SRS. In either case, the ID of the source reference signal identifies the beam.

The TCI state and/or the spatial relation reference RS can determine a spatial Rx filter for reception of downlink channels at the UE, or a spatial Tx filter for transmission of uplink channels from the UE.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
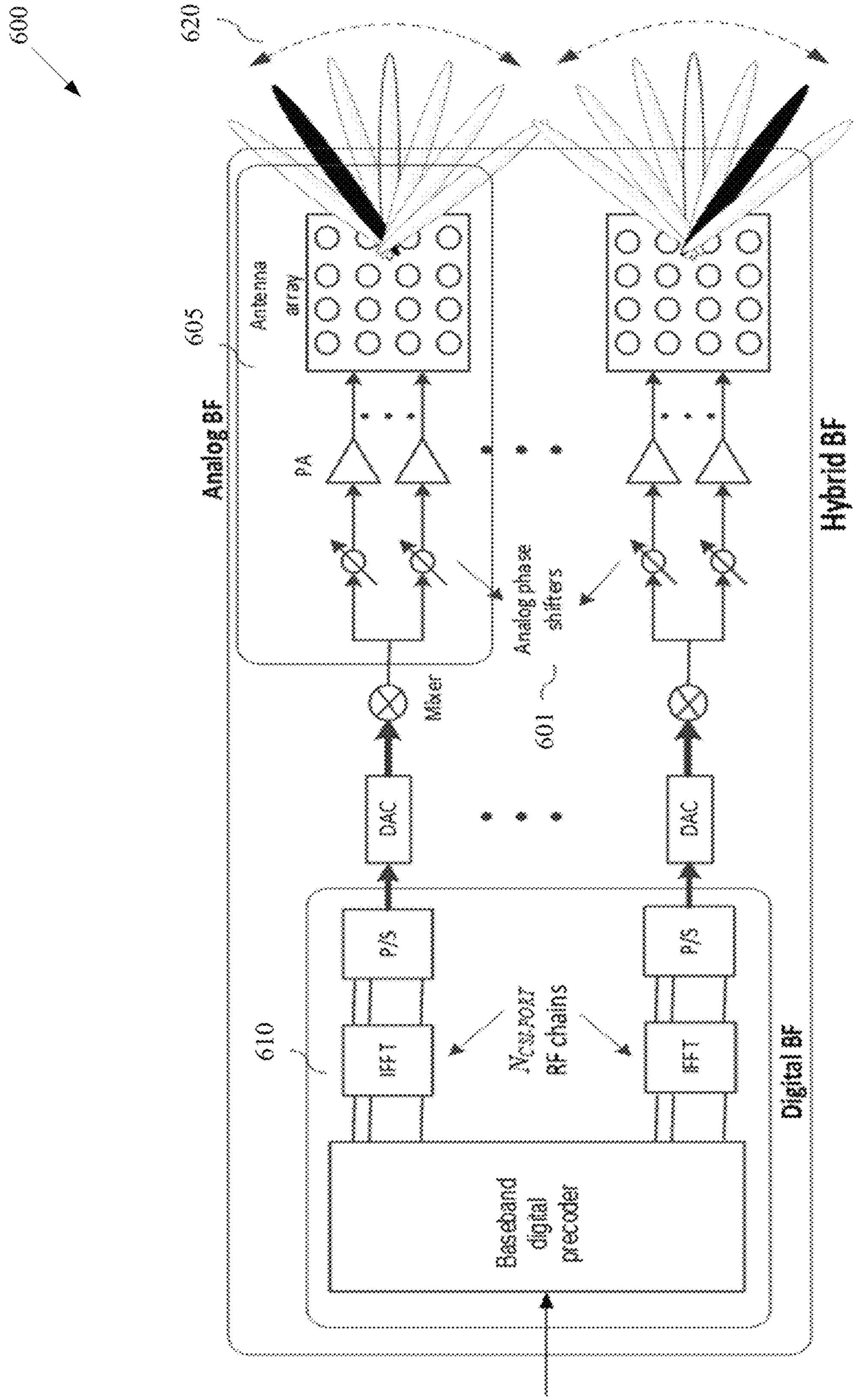
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI-PORT}$. A digital beamforming unit 610 performs a linear combination across $N_{CSI-PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term “multi-beam operation” is used to refer to the overall system aspect. This includes, for the purpose of illustration, indicating the assigned DL or UL TX beam (also termed “beam indication”), measuring at least one reference signal for calculating and performing beam reporting (also termed “beam measurement” and “beam reporting,” respectively), and receiving a DL or UL transmission via a selection of a corresponding RX beam.

The aforementioned system is also applicable to higher frequency bands such as >52.6 GHz. In this case, the system can employ only analog beams. Due to the O2 absorption loss around 60 GHz frequency (~10 dB additional loss @100 m distance), larger number of and sharper analog beams (hence larger number of radiators in the array) may be needed to compensate for the additional path loss.

For a cellular system operation in a sub-1 GHz frequency range (e.g., less than 1 GHz), supporting large number of CSI-RS antenna ports (e.g., 32) at a single location or remote radio head (RRH) or TRP is challenging due to that a larger antenna form factor size is needed at these frequencies than a system operating at a higher frequency such as 2 GHz or 4 GHz. At such low frequencies, the maximum number of CSI-RS antenna ports that can be co-located at a single site (or TRP/RRH) can be limited, for example to 8. This limits the spectral efficiency of such systems. In particular, the MU-MIMO spatial multiplexing gains offered due to large number of CSI-RS antenna ports (such as 32) cannot be achieved.

One way to operate a sub-1 GHz system with large number of CSI-RS antenna ports is based on distributing antenna ports at multiple locations (or TRP/RRHs). The multiple sites or TRPs/RRHs can still be connected to a single (common) base unit, hence the signal transmitted/received via multiple distributed TRPs/RRHs can still be processed at a centralized location. This is called distributed MIMO or multi-TRP coherent joint transmission (C-JT).

The present disclosure relates to electronic devices and methods on CSI reporting for MIMO operations, more particularly, to electronic devices and methods on CSI reporting for high/medium velocity UEs in wireless networks.

Although the focus of the present disclosure is on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

In a wireless communication system, MIMO is often identified as an essential feature in order to achieve high system throughput requirements. One of the key components of a MIMO transmission scheme is the accurate CSI acquisition at the eNB (or gNB) (or TRP). For MU-MIMO, in particular, the availability of accurate CSI is necessary in order to guarantee high MU performance. For TDD systems, the CSI can be acquired using the SRS transmission relying on the channel reciprocity. For FDD systems, on the other hand, it can be acquired using the CSI-RS transmission from eNB (or gNB), and CSI acquisition and feedback from UE. In legacy FDD systems, the CSI feedback framework is “implicit” in the form of CQI/PMI/RI (also CRI and LI) derived from a codebook assuming SU transmission from eNB (or gNB).

In 5G or NR systems as illustrated in 3GPP standard specifications, the above-mentioned “implicit” CSI reporting paradigm from LTE is also supported and referred to as Type I CSI reporting. In addition, a high-resolution CSI reporting, referred to as Type II CSI reporting, is also supported in Release 15 specification to provide more accurate CSI information to gNB for use cases such as high-order MU-MIMO. However, the overhead of Type II CSI reporting can be an issue in practical UE implementations. One approach to reduce Type II CSI overhead is based on frequency domain (FD) compression.

In Rel. 16 NR, DFT-based FD compression of the Type II CSI has been supported (referred to as Rel. 16 enhanced Type II codebook as illustrated in 3GPP standard specification). Some of the key components for this feature includes (a) spatial domain (SD) basis $W_1$, (b) FD basis $W_f$, and (c) coefficients $\tilde{W}_2$ that linearly combine SD and FD basis. In a non-reciprocal FDD system, a complete CSI (comprising all components) needs to be reported by the UE. However, when reciprocity or partial reciprocity does exist between UL and DL, then some of the CSI components can be obtained based on the UL channel estimated using SRS transmission from the UE. In Rel. 16 NR, the DFT-based FD compression is extended to this partial reciprocity case (referred to as Rel. 16 enhanced Type II port selection codebook as illustrated in 3GPP standard specification), wherein the DFT-based SD basis in $W_1$ is replaced with SD CSI-RS port selection, i.e., L out of $$\frac{P_{CSI-RS}}{2}$$

CSI-RS ports are selected (the selection is common for the two antenna polarizations or two halves of the CSI-RS ports). The CSI-RS ports in this case are beamformed in SD (assuming UL-DL channel reciprocity in angular domain), and the beamforming information can be obtained at the gNB based on UL channel estimated using SRS measurements.

In Rel. 17 NR, CSI reporting has been enhanced to support the following examples.

In one example of enhanced Type II port selection codebook, it has been known in the literature that UL-DL channel reciprocity can exist in both angular and delay domains if the UL-DL duplexing distance is small. Since delay in time domain transforms (or closely related to) basis vectors in frequency domain (FD), the Rel. 16 enhanced Type II port selection can be further extended to both angular and delay domains (or SD and FD). In particular, the DFT-based SD basis in $W_1$ and DFT-based FD basis in $W_f$ can be replaced with SD and FD port selection, i.e., L CSI-RS ports are selected in SD or/and M ports are selected in FD. The CSI-RS ports in this case are beamformed in SD (assuming UL-DL channel reciprocity in angular domain) or/and FD (assuming UL-DL channel reciprocity in delay/frequency domain), and the corresponding SD or/and FD beamforming information can be obtained at the gNB based on UL channel estimated using SRS measurements. In Rel. 17, such a codebook is supported (which is referred to as Rel. 17 further enhanced Type II port selection codebook as illustrated in 3GPP standard specification.

In one example of NCJT CSI reporting, when the UE can communicate with multiple TRPs that are distributed at different locations in space (e.g., within a cell), the CSI reporting can correspond to a single TRP hypothesis (i.e., CSI reporting for one of the multiple TRPs), or multi-TRP hypothesis (i.e., CSI reporting for at least two of the multiple TRPs). The CSI reporting for both single TRP and multi-TRP hypotheses are supported in Rel. 17. However, the multi-TRP CSI reporting assume a non-coherent joint transmission (NCJT), i.e., a layer (and precoder) of the transmission is restricted to be transmitted from only one TRP.

In Rel. 18 MIMO, the following objectives on CSI enhancements are supported.

In one objective, enhancements of CSI acquisition for Coherent-JT targeting FR1 and up to 4 TRPs, assuming ideal backhaul and synchronization as well as the same number of antenna ports across TRPs.

In one objective, CSI reporting enhancement for high/medium UE velocities by exploiting time-domain correlation/Doppler-domain information to assist DL precoding, targeting FR1, as follows: (1) Rel-16/17 Type-II codebook refinement, without modification to the spatial and frequency domain basis; and (2) a UE reporting of time-domain channel properties measured via CSI-RS for tracking.

The first objective extends the Rel.17 NCJT CSI to coherent JT (CJT), and the second extends FD compression in the Rel.16/17 codebook to include time (Doppler) domain compression. Both extensions are based on the same legacy codebook, i.e., Rel. 16/17 codebook. In this disclosure, a unified codebook design considering both extensions has been assumed.

The main use case or scenario of interest for CJT/DMIMO is as follows. Although NR supports up to 32 CSI-RS antenna ports, for a cellular system operating in a sub-1 GHz frequency range (e.g., less than 1 GHz), supporting large number of CSI-RS antenna ports (e.g., 32) at one site or remote radio head (RRH) or TRP is challenging due to larger antenna form factors at these frequencies (when compared with a system operating at a higher frequency such as 2 GHz or 4 GHz. At such low frequencies, the maximum number of CSI-RS antenna ports that can be co-located at a site (or RRH or TRP) can be limited, for example to 8.

This limits the spectral efficiency of such systems. In particular, the MU-MIMO spatial multiplexing gains offered due to large number of CSI-RS antenna ports (such as 32) cannot be achieved. One way to operate a sub-1 GHz system with large number of CSI-RS antenna ports is based on distributing antenna ports at multiple sites (or RRHs). The multiple sites or RRHs can still be connected to a single (common) baseband unit, hence the signal transmitted/received via multiple distributed RRHs can still be processed at a centralized location. For example, 32 CSI-RS ports can be distributed across 4 RRHs, each with 8 antenna ports. Such a MIMO system can be referred to as a distributed MIMO (D-MIMO) or a CJT system. An example is illustrated in FIG. 7.

Figure 7:
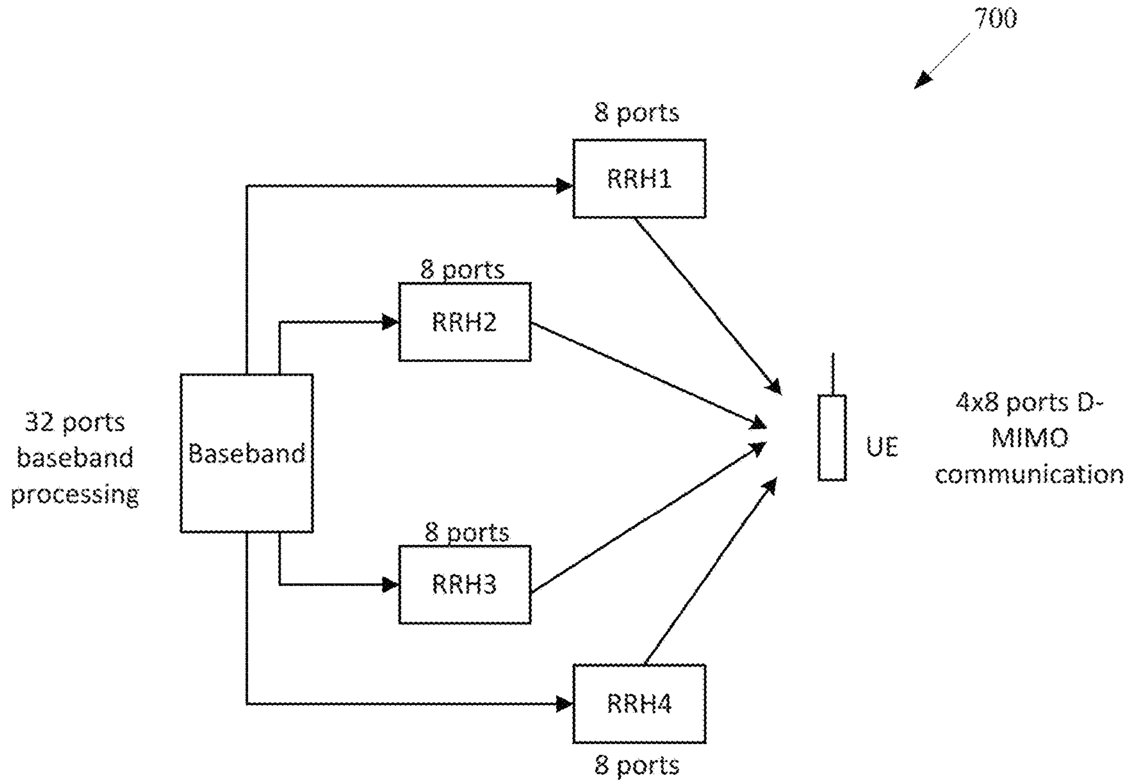
FIG. 7 illustrates an example of multiple-input multiple-output (MIMO) system according to embodiments of the present disclosure.

FIG. 7 illustrates an example of MMO system 700 according to embodiments of the present disclosure. An embodiment of the MMO system 700 shown in FIG. 7 is for illustration only.

The multiple RRHs in a D-MIMO setup can be utilized for spatial multiplexing gain (based on CSI reporting). Since RRHs are geographically separated, they (RRHs) tend to contribute differently in CSI reporting. This motivates a dynamic RRH selection followed by CSI reporting condition on the RRH selection. This disclosure provides example embodiments on how channel and interference signal can be measure under different RRH selection hypotheses. Additionally, the signaling details of such a CSI reporting and CSI-RS measurement are also provided.

Figure 8:
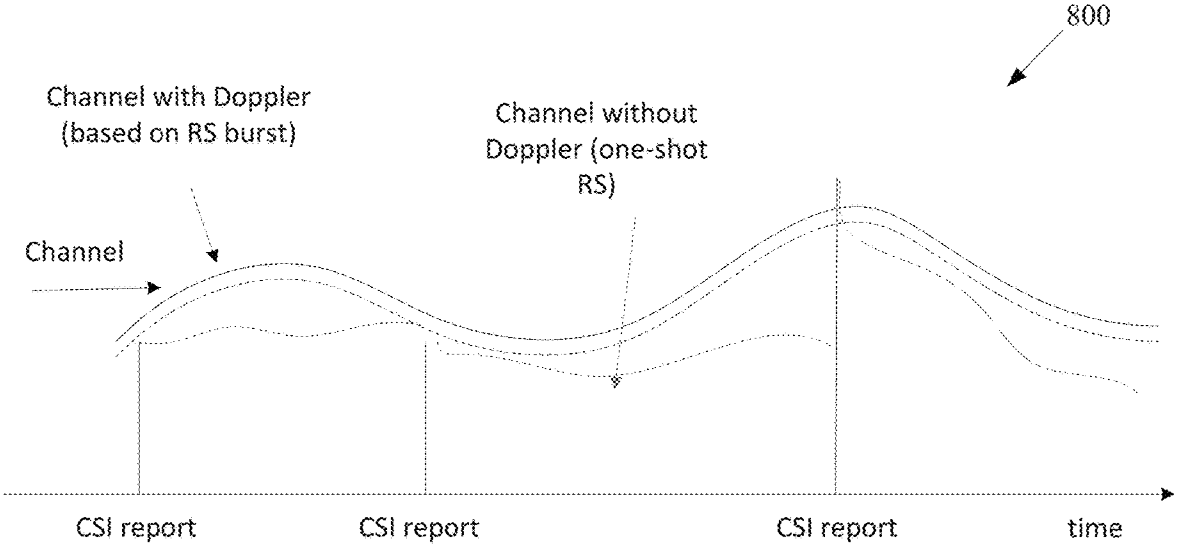
FIG. 8 illustrates an example of Doppler component according to embodiments of the present disclosure.

FIG. 8 illustrated an example of Doppler component 800 according to embodiments of the present disclosure. An embodiment of the Doppler component 800 shown in FIG. 8 is for illustration only.

The main use case or scenario of interest for time-/Doppler-domain compression is moderate to high mobility scenarios. When the UE speed is in a moderate or high speed regime, the performance of the Rel. 15/16/17 codebooks starts to deteriorate quickly due to fast channel variations (which in turn is due to UE mobility that contributes to the Doppler component of the channel), and a one-shot nature of CSI-RS measurement and CSI reporting in Rel. 15/16/17. This limits the usefulness of Rel. 15/16/17 codebooks to low mobility or static UEs only. For moderate or high mobility scenarios, an enhancement in CSI-RS measurement and CSI reporting is needed, which is based on the Doppler components of the channel. As described in 3GPP standard specification, the Doppler components of the channel remain almost constant over a large time duration, referred to as channel stationarity time, which is significantly larger than the channel coherence time.

Note that the current (Rel. 15/16/17) CSI reporting is based on the channel coherence time, which is not suitable when the channel has significant Doppler components. The Doppler components of the channel can be calculated based on measuring a reference signal (RS) burst, where the RS can be CSI-RS or SRS. When RS is CSI-RS, the UE measures a CSI-RS burst, and use it to obtain Doppler components of the DL channel, and when RS is SRS, the gNB measures an SRS burst, and use it to obtain Doppler components of the UL channel. The obtained Doppler components can be reported by the UE using a codebook (as part of a CS report). Or the gNB can use the obtained Doppler components of the UL channel to beamform CSI-RS for CSI reporting by the UE. An illustration of channel measurement with and without Doppler components is shown in FIG. 8.

When the channel is measured with the Doppler components (e.g., based on an RS burst), the measured channel can remain close to the actual varying channel. On the other hand, when the channel is measured without the Doppler components (e.g., based on a one-shot RS), the measured channel can be far from the actual varying channel.

The present disclosure relates to CSI acquisition at a gNB. In particular, it relates to the CSI reporting based on a high-resolution (or Type II) codebook comprising spatial-, frequency- and time- (Doppler-) domain components for a distributed antenna structure (DMIMO). The 4 most novel aspects are as follows: (1) identity vs DFT DD/TD basis; (2) condition when identity or DFT DD basis is used; (3) Supported values of N4 (length of DD basis) and number of DD basis vectors; and (4) a precoder equation.

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can consist of one or multiple slots) or one slot.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

A "CSI reporting band" is defined as a set/collection of subbands, either contiguous or non-contiguous, wherein CSI reporting is performed. For example, CSI reporting band can include all the subbands within the DL system bandwidth. This can also be termed "full-band." Alternatively, CSI reporting band can include only a collection of subbands within the DL system bandwidth. This can also be termed "partial band."

The term "CSI reporting band" is used only as an example for representing a function. Other terms such as "CSI reporting subband set" or "CSI reporting bandwidth" or bandwidth part (BWP) can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g., via RRC signaling), a UE can report CSI associated with $n \le N$ CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, a CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 9:
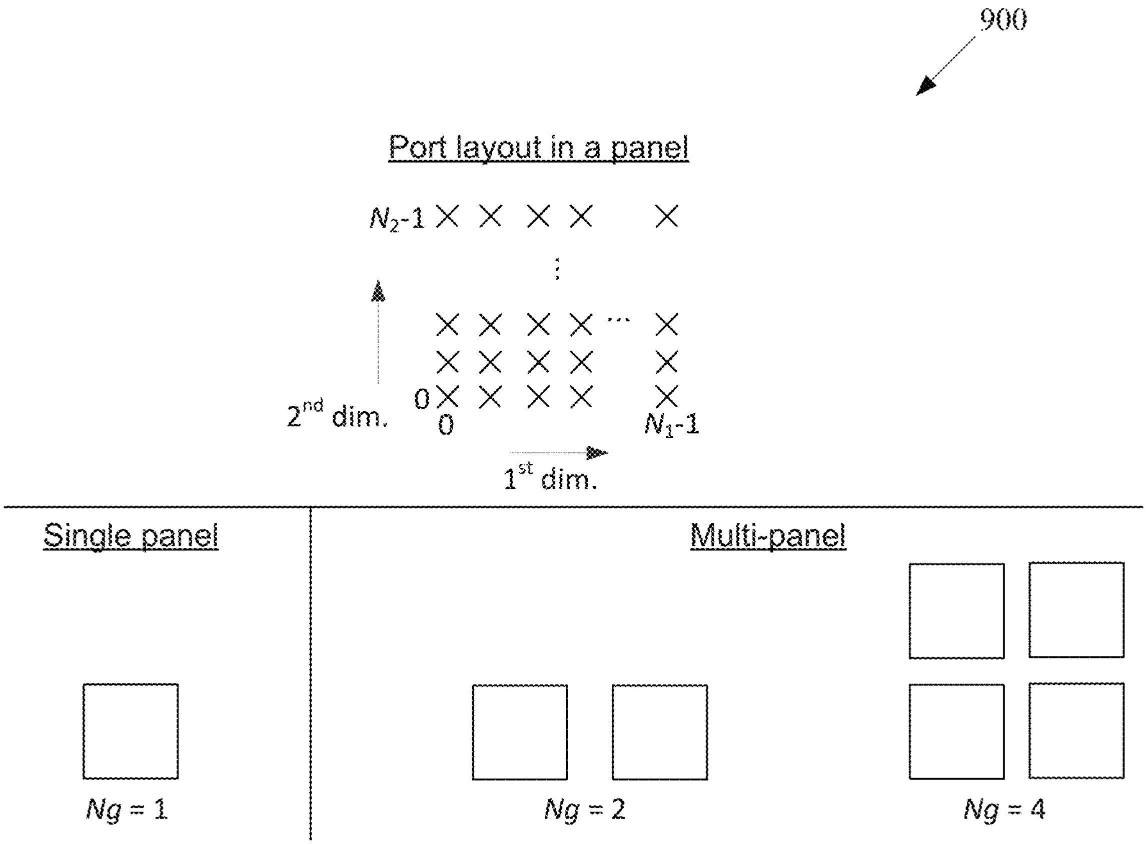
FIG. 9 illustrates an example of antenna port layout according to embodiments of the present disclosure.

FIG. 9 illustrates an example of antenna port layout 900 according to embodiments of the present disclosure. An embodiment of the antenna port layout 900 shown in FIG. 9 is for illustration only.

In the following, it may assume that $N_1$ and $N_2$ are the number of antenna ports with the same polarization in the first and second dimensions, respectively. For 2D antenna port layouts, there may be $N_1>1$, $N_2>1$, and for 1D antenna port layouts $N_1>1$ and $N_2=1$. So, for a dual-polarized antenna port layout, the total number of antenna ports is $2N_1N_2$ when each antenna maps to an antenna port. An illustration is shown in FIG. 9 where "X" represents two antenna polarizations. In this disclosure, the term "polarization" refers to a group of antenna ports. For example, antenna ports $$j = X + 0, X + 1, \ldots, X + \frac{P_{CSIRS}}{2} - 1$$

comprise a first antenna polarization, and antenna ports $$j = X + \frac{P_{CSIRS}}{2}, X + \frac{P_{CSIRS}}{2} + 1, \ldots, X + P_{CSIRS} - 1$$

comprise a second antenna polarization, where $P_{CSIRS}$ is a number of CSI-RS antenna ports and X is a starting antenna port number (e.g., X=3000, then antenna ports are 3000, 3001, 3002, . . . ). Let $N_g$ be a number of antenna panels at the gNB. When there are multiple antenna panels ($N_g>1$), it may assume that each panel is dual-polarized antenna ports with $N_1$ and $N_2$ ports in two dimensions. This is illustrated in FIG. 9 Note that the antenna port layouts may or may not be the same in different antenna panels.

In one example, the antenna architecture of a D-MIMO or CJT (coherent joint-transmission) system is structured. For example, the antenna structure at each RRH (or TRP) is dual-polarized (single or multi-panel as shown in FIG. 9. The antenna structure at each RRH/TRP can be the same. Or the antenna structure at an RRH/TRP can be different from another RRH/TRP. Likewise, the number of ports at each RRH/TRP can be the same. Or the number of ports at one RRH/TRP can be different from another RRH/TRP. In one example, $N_g=N_{RRH}$, a number of RRHs/TRPs in the D-MIMO transmission.

In another example, the antenna architecture of a D-MIMO or CJT (coherent joint-transmission) system is unstructured. For example, the antenna structure at one RRH/TRP can be different from another RRH/TRP.

It may assume a structured antenna architecture in the rest of the disclosure. For simplicity, it may assume each RRH/TRP is equivalent to a panel (cf. FIG. 9), although, an RRH/TRP can have multiple panels in practice. The disclosure however is not restrictive to a single panel assumption at each RRH/TRP, and can easily be extended (covers) the case when an RRH/TRP has multiple antenna panels.

In one embodiment, an RRH constitutes (or corresponds to or is equivalent to or is associated with) at least one of the following examples.

In one example, an RRH corresponds to a TRP.

In one example, an RRH or TRP corresponds to a CSI-RS resource. A UE is configured with $K=N_{RRH}=(N_{TRP})>1$ non-zero-power (NZP) CSI-RS resources, and a CSI reporting is configured to be across multiple CSI-RS resources. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure.

In one example, an RRH or TRP corresponds to a CSI-RS resource group, where a group comprises one or multiple NZP CSI-RS resources. A UE is configured with $K \geq N_{RRH}>1$ non-zero-power (NZP) CSI-RS resources, and a CSI reporting is configured to be across multiple CSI-RS resources from resource groups. This is similar to Class B, K>1 configuration in Rel. 14 LTE. The K NZP CSI-RS resources can belong to a CSI-RS resource set or multiple CSI-RS resource sets (e.g., K resource sets each comprising one CSI-RS resource). The details are as explained earlier in this disclosure. In particular, the K CSI-RS resources can be partitioned into $N_{RRH}$ resource groups. The information about the resource grouping can be provided together with the CSI-RS resource setting/configuration, or with the CSI reporting setting/configuration, or with the CSI-RS resource configuration.

In one example, an RRH or TRP corresponds to a subset (or a group) of CSI-RS ports. A UE is configured with at least one NZP CSI-RS resource comprising (or associated with) CSI-RS ports that can be grouped (or partitioned) multiple subsets/groups/parts of antenna ports, each corresponding to (or constituting) an RRH/TRP. The information about the subsets of ports or grouping of ports can be provided together with the CSI-RS resource setting/configuration, or with the CSI reporting setting/configuration, or with the CSI-RS resource configuration.

In one example, an RRH or TRP corresponds to examples disclosed in the present disclosure depending on a configuration. For example, this configuration can be explicit via a parameter (e.g., an RRC parameter). Or the configuration can be implicit.

In one example, when implicit, it could be based on the value of K. For example, when K>1 CSI-RS resources, an RRH corresponds to example provided in the present disclosure, and when K=1 CSI-RS resource, an RRH corresponds to example provided in the present disclosure.

In another example, the configuration could be based on the configured codebook. For example, an RRH corresponds to a CSI-RS resource (e.g., example provided in the present disclosure) or resource group (e.g., examples as provided in the present disclosure) when the codebook corresponds to a decoupled codebook (modular or separate codebook for each RRH), and an RRH corresponds to a subset (or a group) of CSI-RS ports (e.g., example as provided in the present disclosure) when codebook corresponds to a coupled (joint or coherent) codebook (one joint codebook across TRPs/RRHs).

In one example, when RRH or TRP maps (or corresponds to) a CSI-RS resource or resource group (e.g., example as provided in the present disclosure), and a UE can select a subset of TRPs/RRHs (resources or resource groups) and report the CSI for the selected TRPs/RRHs (resources or resource groups), the selected TRPs/RRHs can be reported via an indicator. For example, the indicator can be a CRI or a PMI (component) or a new indicator.

In one example, when RRH or TRP maps (or corresponds to) a CSI-RS port group (e.g., example as provided in the present disclosure), and a UE can select a subset of TRPs/RRHs (port groups) and report the CSI for the selected TRPs/RRHs (port groups), the selected TRPs/RRHs can be reported via an indicator. For example, the indicator can be a CRI or a PMI (component) or a new indicator.

In one example, when multiple (K>1) CSI-RS resources are configured for $N_{RRH}$ TRPs/RRHs (e.g., examples as provided in the present disclosure), a decoupled (modular) codebook is used/configured, and when a single (K=1) CSI-RS resource for $N_{RRH}$ TRPs/RRHs (e.g., examples as provided in the present disclosure), a joint codebook is used/configured.

Figure 10:
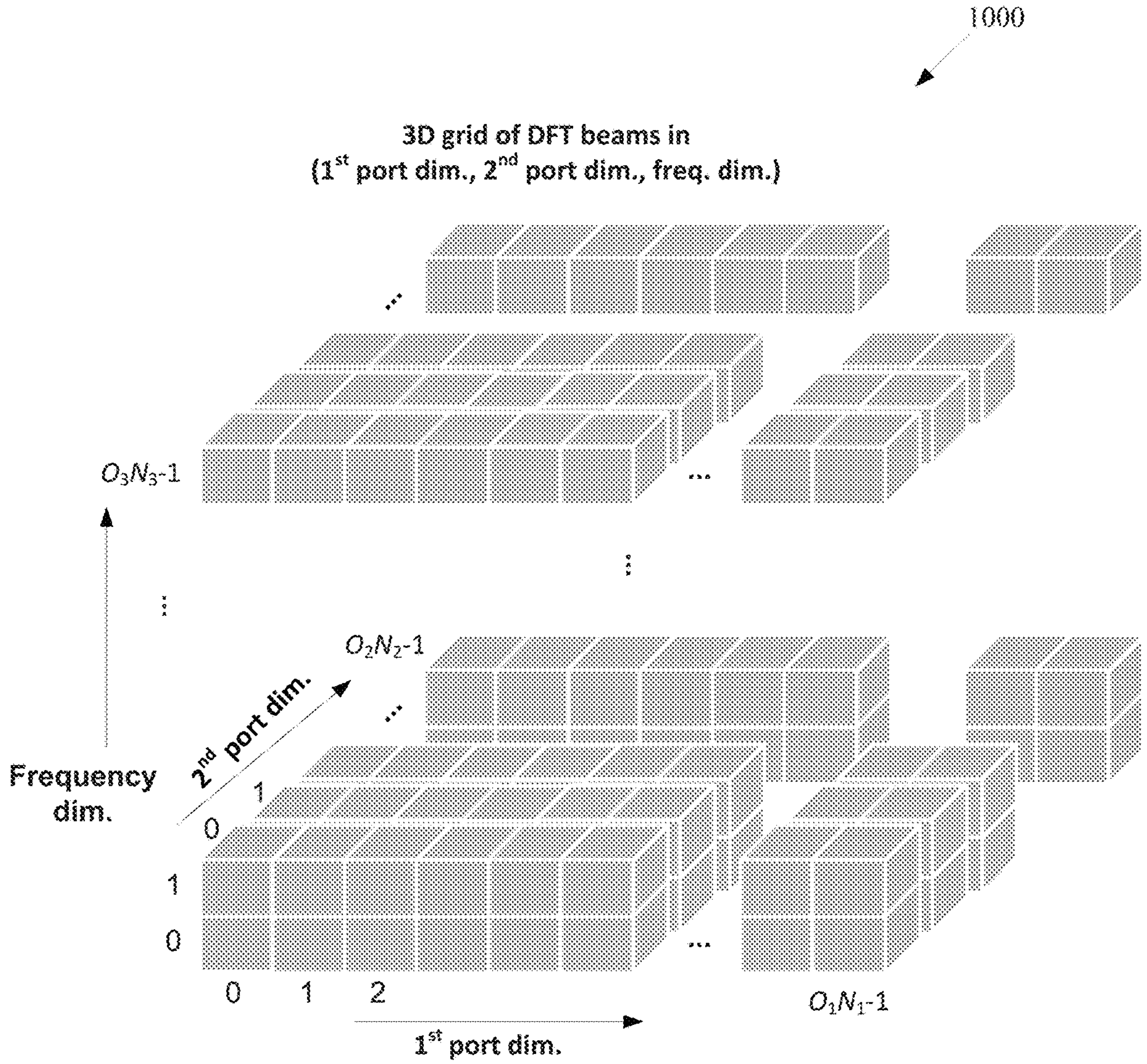
FIG. 10 illustrates an example of 3D grid of discrete Fourier transform (DFT) vectors according to embodiments of the present disclosure.

As described in U.S. Pat. No. 10,659,118, which is incorporated herein by reference in its entirety, a UE is configured with high-resolution (e.g., Type II) CSI reporting in which the linear combination based Type II CSI reporting framework is extended to include frequency dimension in addition to the 1st and 2nd antenna port dimensions. An illustration of the 3D grid of the oversampled DFT vectors (1st port dim., 2nd port dim., freq. dim.) is shown in FIG. 10 in which: (1) 1st dimension is associated with the 1st port dimension, (2) 2nd dimension is associated with the 2nd port dimension, and (3) 3rd dimension is associated with the frequency dimension.

FIG. 10 illustrates an example of 3D grid of DFT beams 1000 according to embodiments of the present disclosure. An embodiment of the 3D grid of DFT vectors 1000 shown in FIG. 10 is for illustration only.

The basis sets for $1^{st}$ and $2^{nd}$ port domain representation are oversampled DFT codebooks of length-$N_1$ and length-$N_2$, respectively, and with oversampling factors $O_1$ and $O_2$, respectively. Likewise, the basis set for frequency domain representation (i.e., 3rd dimension) is an oversampled DFT codebook of length-$N_3$ and with oversampling factor $O_3$. In one example, $O_1=O_2=O_3=4$. In one example, $O_1=O_2=4$ and $O_3=1$. In another example, the oversampling factors $O_i$ belongs to {2, 4, 8}. In yet another example, at least one of $O_1$, $O_2$, and $O_3$ is higher layer configured (via RRC signaling).

As explained in 3GPP standard specification TS38.213, a UE is configured with higher layer parameter codebookType set to "typeII-PortSelection-r16" for an enhanced Type II CSI reporting in which the pre-coders for all SBs and for a given layer l=1, . . . , v, where v is the associated RI value, is given by either:

$$W^l = AC_lB^H = [a_0 \ a_1 \ \ldots \ a_{L-1}] \begin{bmatrix} c_{l,0,0} & c_{l,0,1} & \cdots & c_{l,0,M-1} \\ c_{l,1,0} & c_{l,1,1} & \cdots & c_{l,1,M-1} \\ \vdots & \vdots & \vdots & \vdots \\ c_{l,L-1,0} & c_{l,L-1,1} & \cdots & c_{l,L-1,M-1} \end{bmatrix} \quad \text{(Eq. 1)}$$

-continued $$[b_0\ \ b_1 \ldots b_{M-1}]^H = \sum_{f=0}^{M-1}\sum_{i=0}^{L-1} c_{l,i,f}\left(a_i b_f^H\right) = \sum_{i=0}^{L-1}\sum_{f=0}^{M-1} c_{l,i,f}\left(a_i b_f^H\right)$$

or $$W^l = \begin{bmatrix} A & 0 \\ 0 & A \end{bmatrix} C_l B^H = \tag{Eq. 2}$$

$$\begin{bmatrix} a_0 a_1 \ldots a_{L-1} & 0 \\ 0 & a_0 a_1 \ldots a_{L-1} \end{bmatrix} \begin{bmatrix} c_{l,0,0} & c_{l,0,1} & \ldots & c_{l,0,M-1} \\ c_{l,1,0} & c_{l,1,1} & \ldots & c_{l,1,M-1} \\ \vdots & \vdots & \vdots & \vdots \\ c_{l,L-1,0} & c_{l,L-1,1} & \ldots & c_{l,L-1,M-1} \end{bmatrix}$$

$$[b_0 b_1 \ldots b_{M-1}]^H = \begin{bmatrix} \sum_{f=0}^{M-1}\sum_{i=0}^{L-1} c_{l,i,f}\left(a_i b_f^H\right) \\ \sum_{f=0}^{M-1}\sum_{i=0}^{L-1} c_{l,i+L,f}\left(a_i b_f^H\right) \end{bmatrix}$$

In such equations: (1) $N_1$ is a number of antenna ports in a first antenna port dimension (having the same antenna polarization), (2) $N_2$ is a number of antenna ports in a second antenna port dimension (having the same antenna polarization, (3) $P_{CSI-RS}$ is a number of CSI-RS ports configured to the UE, (4) $N_3$ is a number of SBs for PMI reporting or number of FD units or number of FD components (that comprise the CSI reporting band) or a total number of precoding matrices indicated by the PMI (one for each FD unit/component), (5) $a_i$ is a $2N_1N_2\times1$ (Eq. 1) or $N_1N_2\times1$ (Eq. 2) column vector, or $a_i$ is a $P_{CSIRS}\times1$ (Eq. 1) or $$\frac{P_{CSIRS}}{2}\times 1$$

port selection column vector, where a port selection vector is a defined as a vector which contains a value of 1 in one element and zeros elsewhere, (6) $b_f$ is a $N_3\times1$ column vector, and (7) $c_{l,i,f}$ is a complex coefficient.

In a variation, when the UE reports a subset K<2LM coefficients (where K is either fixed, configured by the gNB or reported by the UE), then the coefficient $c_{l,i,f}$ in precoder equations Eq. 1 or Eq. 2 is replaced with $x_{l,i,f}\times c_{l,i,f}$, where: (1) $x_{l,i,f}=1$ if the coefficient $c_{l,i,f}$ is reported by the UE according to some embodiments of the present disclosure, and (2) $x_{l,i,f}=0$ otherwise (i.e., $c_{l,i,f}$ is not reported by the UE).

The indication whether $x_{l,i,f}=1$ or 0 is according to some embodiments of the present disclosure. For example, the indication can be via a bitmap.

In a variation, the precoder equations Eq. 1 or Eq. 2 are respectively generalized to $$W^l = \sum_{i=0}^{L-1}\sum_{f=0}^{M_i-1} c_{l,i,f}\left(a_i b_{i,f}^H\right) \tag{Eq. 3}$$

and $$W^l = \begin{bmatrix} \sum_{i=0}^{L-1}\sum_{f=0}^{M_i-1} c_{l,i,f}\left(a_i b_{i,f}^H\right) \\ \sum_{i=0}^{L-1}\sum_{=0}^{M_i-1} c_{l,i+L,f}\left(a_i b_{i,f}^H\right) \end{bmatrix} \tag{Eq. 4}$$

where for a given i, the number of basis vectors is $M_i$ and the corresponding basis vectors are $\{b_{i,f}\}$. Note that $M_i$ is the number of coefficients $c_{l,i,f}$ reported by the UE for a given i, where $M_i\leq M$ (where $\{M_i\}$ or $\Sigma M_i$ is either fixed, configured by the gNB or reported by the UE).

The columns of $W^l$ are normalized to norm one. For rank R or R layers (υ=R), the pre-coding matrix is given by $$W^{(R)} = \frac{1}{\sqrt{R}}\left[W^1\ \ W^2\ \ \ldots\ \ W^R\right]. \tag{Eq. 2}$$

is assumed in the rest of the disclosure. The embodiments of the disclosure, however, are general and are also application to Eq. 1, Eq. 3 and Eq. 4.

Here $$L \leq \frac{P_{CSI-RS}}{2} \text{ and } M \leq N_3. \text{ If } L = \frac{P_{CSI-RS}}{2},$$

then A is an identity matrix, and hence not reported. Likewise, if $M=N_3$, then B is an identity matrix, and hence not reported. Assuming $M<N_3$, in an example, to report columns of B, the oversampled DFT codebook is used. For instance, $b_f=w_f$, where the quantity $w_f$ is given by $$w_f = \left[1\ \ e^{j\frac{2\pi n_{3,l}^{(f)}}{O_3N_3}}\ \ e^{j\frac{2\pi.2n_{3,l}^{(f)}}{O_3N_3}}\ \ \ldots\ \ e^{j\frac{2\pi.(N_3-1)n_{3,l}^{(f)}}{O_3N_3}}\right]^T.$$

When $O_3=1$, the FD basis vector for layer $l\in\{1, \ldots, \upsilon\}$ (where υ is the RI or rank value) is given by $$w_f = \left[y_{0,l}^{(f)}\ \ y_{1,l}^{(f)}\ \ \ldots\ \ y_{N_3-1,l}^{(f)}\right]^T, \text{ where}$$

$$y_{t,l}^{(f)} = e^{j\frac{2\pi t n_{3,l}^{(f)}}{N_3}} \text{ and}$$

$$n_{3,l} = \left[n_{3,l}^{(0)}, \ldots, n_{3,l}^{(M-1)}\right] \text{ where}$$

$$n_{3,l}^{(f)} \in \{0, 1, \ldots, N_3-1\}.$$

In another example, discrete cosine transform DCT basis is used to construct/report basis B for the 3rd dimension. The m-th column of the DCT compression matrix is simply given by $$[W_f]_{nm} = \begin{cases} \frac{1}{\sqrt{K}}, & n=0 \\ \sqrt{\frac{2}{K}}\cos\frac{\pi(2m+1)n}{2K}, & n=1, \ldots, K-1 \end{cases},$$

$$\text{and } K=N_3, \text{ and } m=0, \ldots, N_3-1.$$

Since DCT is applied to real valued coefficients, the DCT is applied to the real and imaginary components (of the channel or channel eigenvectors) separately. Alternatively, the DCT is applied to the magnitude and phase components (of the channel or channel eigenvectors) separately. The use of DFT or DCT basis is for illustration purpose only. The disclosure is applicable to any other basis vectors to construct/report A and B.

On a high level, a precoder $W^l$ can be described as follows:

$$W = A_l C_l B_l^H = W_1 \tilde{W}_2 W_f^H, \quad \text{(Eq. 5)}$$

where $A=W_1$ corresponds to the Rel. 15 $W_1$ in Type II CSI codebook as shown in 3GPP standard specification, and $B=W_f$.

The $C_l=\tilde{W}_2$ matrix consists of all the required linear combination coefficients (e.g., amplitude and phase or real or imaginary). Each reported coefficient ($c_{l,i,f}=p_{l,i,f}\phi_{l,i,f}$) in $\tilde{W}_2$ is quantized as amplitude coefficient ($p_{l,i,f}$) and phase coefficient ($\phi_{l,i,f}$). In one example, the amplitude coefficient ($p_{l,i,f}$) is reported using a A-bit amplitude codebook where A belongs to {2, 3, 4}. If multiple values for A are supported, then one value is configured via higher layer signaling.

In another example, the amplitude coefficient ($p_{l,i,f}$) is reported as $$p_{l,i,f} = p_{l,i,f}^{(1)} p_{l,i,f}^{(2)}$$

where: (1)

$$p_{l,i,f}^{(1)}$$

is a reference or first amplitude which is reported using a A1-bit amplitude codebook where A1 belongs to {2, 3, 4}, and (2)

$$p_{l,i,f}^{(2)}$$

is a differential or second amplitude which is reported using a A2-bit amplitude codebook where A2≤A1 belongs to {2, 3, 4}.

For layer l, it may denote the linear combination (LC) coefficient associated with spatial domain (SD) basis vector (or beam) i∈{0, 1, . . . , 2L−1} and frequency domain (FD) basis vector (or beam) f∈{0, 1, . . . , M−1} as $c_{l,i,f}$, and the strongest coefficient as $c_{l,i^*,f^*}$. The strongest coefficient is reported out of the $K_{NZ}$ non-zero (NZ) coefficients that is reported using a bitmap, where $K_{NZ} \le K_0 = \lceil \beta \times 2LM \rceil < 2LM$ and β is higher layer configured. The remaining $2LM-K_{NZ}$ coefficients that are not reported by the UE are assumed to be zero.

The following quantization scheme is used to quantize/report the $K_{NZ}$ NZ coefficients.

In one example, a UE reports the following for the quantization of the NZ coefficients in $\tilde{W}_2$: (1) a X-bit indicator for the strongest coefficient index (i*, f*), where $X=\lceil \log_2 K_{NZ} \rceil$ or $\lceil \log_2 2L \rceil$: (i) strongest coefficient $c_{l,i^*,f^*}=1$ (hence its amplitude/phase are not reported); (2) two antenna polarization-specific reference amplitudes are used: (i) for the polarization associated with the strongest coefficient $c_{l,i^*,f^*}=1$, since the reference amplitude $$p_{l,i,f}^{(1)} = 1,$$

it is not reported; and (ii) for the other polarization, reference amplitude $$p_{l,i,f}^{(1)}$$

is quantized to 4 bits. In such instance, the 4-bit amplitude alphabet is $$\left\{1, \left(\frac{1}{2}\right)^{\frac{1}{4}}, \left(\frac{1}{4}\right)^{\frac{1}{4}}, \left(\frac{1}{8}\right)^{\frac{1}{4}}, \ldots, \left(\frac{1}{2^{14}}\right)^{\frac{1}{4}}\right\}; (3) \text{ for}$$

$$\{c_{l,i,f}, (i, f) \neq (i^*, f^*)\}:(i)$$

for each polarization, differential amplitudes $$p_{l,i,f}^{(2)}$$

of the coefficients calculated relative to the associated polarization-specific reference amplitude and quantized to 3 bits, in such instance, the 3-bit amplitude alphabet is $$\left\{1, \frac{1}{\sqrt{2}}, \frac{1}{2}, \frac{1}{2\sqrt{2}}, \frac{1}{4}, \frac{1}{4\sqrt{2}}, \frac{1}{8}, \frac{1}{8\sqrt{2}}\right\}.$$

Note: the final quantized amplitude $p_{l,i,f}$ is given by $$p_{l,i,f}^{(2)} \times p_{l,i,f}^{(2)};$$

and (ii) each phase is quantized to either 8PSK ($N_{ph}=8$) or 16PSK ($N_{ph}=16$) (which is configurable).

For the polarization r*∈{0,1} associated with the strongest coefficient $c_{l,i^*,f^*}$, there may be $$r^* = \left\lfloor \frac{i^*}{L} \right\rfloor$$

and the reference amplitude $$p_{l,i,f}^{(1)} = p_{l,r^*}^{(1)} = 1.$$

For the other polarization r∈{0,1} and r≠r*, there may be $$r = \left(\left\lfloor \frac{i^*}{L} \right\rfloor + 1\right)$$

mod 2 and the reference amplitude $$p_{l,i,f}^{(1)} = p_{l,r}^{(1)}$$

is quantized (reported) using the 4-bit amplitude codebook mentioned above.

In Rel. 16 enhanced Type II and Type II port selection codebooks, a UE can be configured to report M FD basis vectors. In one example, $$M = \left\lceil p \times \frac{N_3}{R} \right\rceil,$$

where R is higher-layer configured from {1, 2} and p is higher-layer configured from {¼, ½}. In one example, the p value is higher-layer configured for rank 1-2 CSI reporting. For rank >2 (e.g., rank 3-4), the p value (denoted by $v_0$) can be different. In one example, for rank 1-4, (p, $v_0$) is jointly configured from $$\left\{\left(\frac{1}{2}, \frac{1}{4}\right), \left(\frac{1}{4}, \frac{1}{4}\right), \left(\frac{1}{4}, \frac{1}{8}\right)\right\}, \text{ i.e., } M = \left\lceil p \times \frac{N_3}{R} \right\rceil$$

for rank 1-2 and $$M = \left\lceil v_0 \times \frac{N_3}{R} \right\rceil$$

for rank 3-4. In one example, $N_3=N_{SB}\times R$ where N SB is the number of SBs for CQI reporting. In one example, M is replaced with $M_\upsilon$, to show its dependence on the rank value υ, hence p is replaced with $p_\upsilon$, υ∈{1, 2} and $v_0$ is replaced with $p_\upsilon$, υ∈{3, 4}.

A UE can be configured to report $M_\upsilon$ FD basis vectors in one-step from $N_3$ basis vectors freely (independently) for each layer l∈{1, . . . , υ} of a rank υ CSI reporting. Alternatively, a UE can be configured to report $M_\upsilon$ FD basis vectors in two-step as follows: (1) in step 1, an intermediate set (InS) comprising $N'_3<N_3$ basis vectors is selected/reported, wherein the InS is common for all layers; and (2) in step 2, for each layer l∈{1, . . . , υ} of a rank υ CSI reporting, $M_\upsilon$ FD basis vectors are selected/reported freely (independently) from M basis vectors in the InS.

In one example, one-step method is used when $N_3\leq 19$ and two-step method is used when $N_3>19$. In one example, $N'_3=\lceil \alpha M_\upsilon \rceil$ where α>1 is either fixed (to 2 for example) or configurable.

The codebook parameters used in the DFT based frequency domain compression (eq. 5) are (L, $p_\upsilon$, for υ∈{1,2}, $p_\upsilon$ for υ∈{3,4}, β, α, $N_{ph}$). The set of values for these codebook parameters are as follows: (1) L: the set of values is {2,4} in general, except L∈{2,4,6} for rank 1-2, 32 CSI-RS antenna ports, and R=1; (2) ($p_\upsilon$ for υ∈{1,2}, $p_\upsilon$ for υ∈{3,4})∈{(½, ¼), (¼, ¼), (¼, ⅛)}; (3) β∈{¼, ½, ¾}; (4) α=2; and (5) $N_{ph}$=16.

The set of values for these codebook parameters are as in TABLE 1.

TABLE 1

Values for the codebook parameters

| paramCombination-r16 | L | $p_\upsilon$ υ ∈ {1, 2} | $p_\upsilon$ υ ∈ {3, 4} | β |
|---|---|---|---|---|
| 1 | 2 | ¼ | ⅛ | ¼ |
| 2 | 2 | ¼ | ⅛ | ½ |
| 3 | 4 | ¼ | ⅛ | ¼ |
| 4 | 4 | ¼ | ⅛ | ½ |
| 5 | 4 | ¼ | ¼ | ¾ |
| 6 | 4 | ½ | ¼ | ½ |
| 7 | 6 | ¼ | — | ½ |
| 8 | 6 | ¼ | — | ¾ |

In Rel. 17 (further enhanced Type II port selecting codebook), M∈{1,2}, $$L = \frac{K_1}{2}$$

where $K_1=\alpha\times P_{CSIRS}$, and codebook parameters (M, α, β) are configured from TABLE 2.

TABLE 2

Values for the codebook parameters

| paramCombination-r17 | M | α | β |
|---|---|---|---|
| 1 | 1 | ¾ | ½ |
| 2 | 1 | 1 | ½ |
| 3 | 1 | 1 | ¾ |
| 4 | 1 | 1 | 1 |
| 5 | 2 | ½ | ½ |
| 6 | 2 | ¾ | ½ |
| 7 | 2 | 1 | ½ |
| 8 | 2 | 1 | ¾ |

The above-mentioned framework (e.g., Eq. 5) represents the precoding-matrices for multiple ($N_3$) FD units using a linear combination (double sum) over 2L (or $K_1$) SD beams/ports and $M_\upsilon$ FD beams. This framework can also be used to represent the precoding-matrices in time domain (TD) by replacing the FD basis matrix $W_f$ with a TD basis matrix $W_t$, wherein the columns of $W_t$ comprises $M_\upsilon$ TD beams that represent some form of delays or channel tap locations. Hence, a precoder $W^l$ can be described as follows:

$$W = A_l C_l B_l^H = W_1 \tilde{W}_2 W_t^H, \tag{5A}$$

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

In one example, the $M_\upsilon$ TD beams (representing delays or channel tap locations) are selected from a set of $N_3$ TD beams, i.e., $N_3$ corresponds to the maximum number of TD units, where each TD unit corresponds to a delay or channel tap location. In one example, a TD beam corresponds to a single delay or channel tap location. In another example, a TD beam corresponds to multiple delays or channel tap locations. In another example, a TD beam corresponds to a combination of multiple delays or channel tap locations.

The present disclosure is applicable to both space-frequency (equation 5) and space-time (equation 5A) frameworks.

In the present disclosure, the mentioned framework for CSI reporting based on space-frequency compression (equation 5) or space-time compression (equation 5A) frameworks can be extended in two directions: (1) time or Doppler domain compression (e.g., for moderate to high mobility UEs) and (2) joint transmission across multiple RRHs/TRP (e.g., for a DMIMO or multiple TRP systems).

Figure 11:
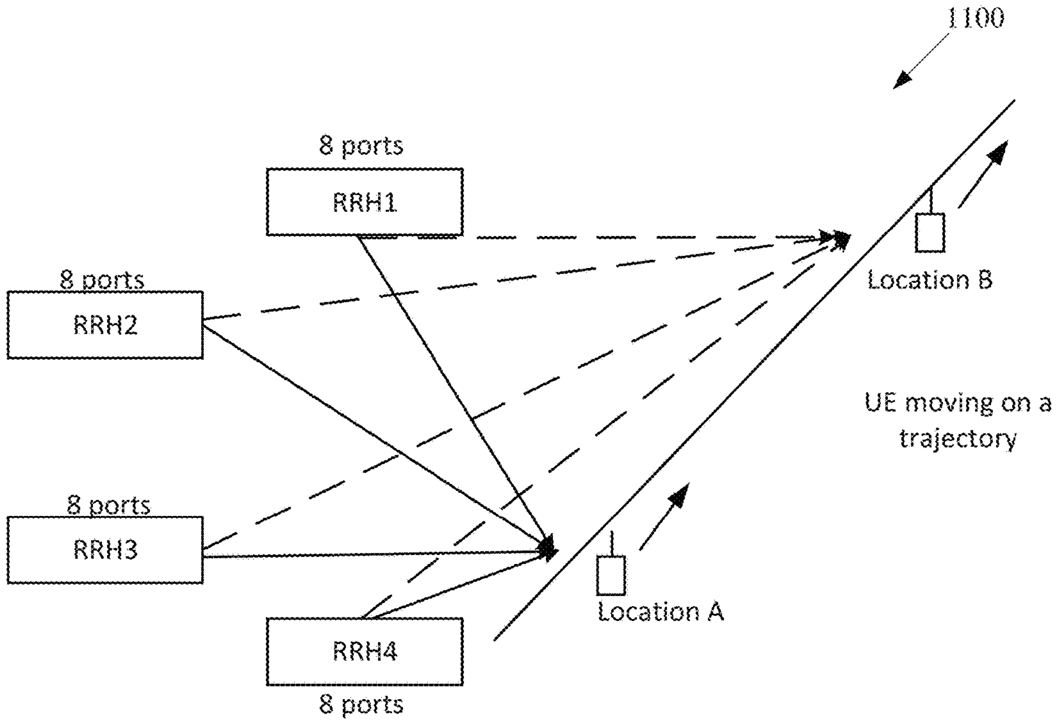
FIG. 11 illustrates an example of UE moving on a linear trajectory in a distributed MIMO (D-MIMO) system according to embodiments of the present disclosure.

FIG. 11 illustrates an example of UE moving on a linear trajectory in a DMIMO system 1100 according to embodiments of the present disclosure. An embodiment of the UE moving on a linear trajectory in a DMIMO system 1100 shown in FIG. 11 is for illustration only.

An illustration of a UE moving on a trajectory located in a DMIMO system is shown in FIG. 11. While the UE moves from a location A to another location B at high speed (e.g., 60 kmph), the UE measures the channel and the interference (e.g., via NZP CSI-RS resources and CSI-IM resources, respectively), uses them to determine/report CSI considering CJT from multiple RRHs. The reported CSI can be based on a codebook, which includes components considering both multiple RRHs, and time-/Doppler-domain channel compression.

Figure 12:
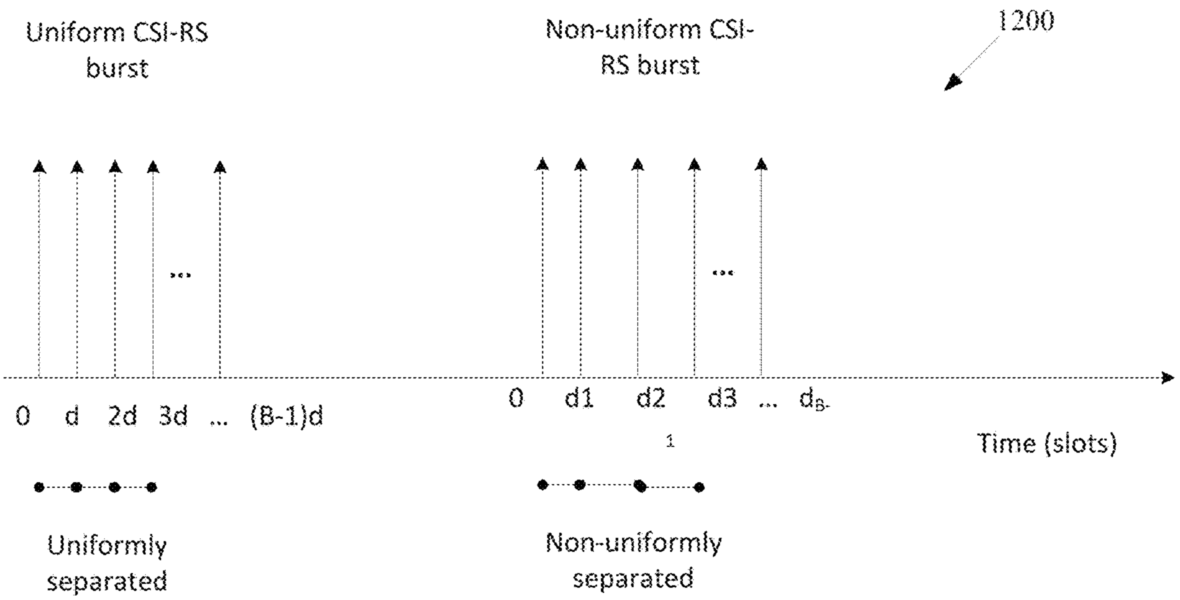
FIG. 12 illustrates an example of UE configuration to receive a burst of non-zero power (NZP) CSI-RS resources according to embodiments of the present disclosure.

FIG. 12 illustrates an example of UE configuration to receive a burst of NZP CSI-RS resources 1200 according to embodiments of the present disclosure. An embodiment of the UE configuration to receive a burst of NZP CSI-RS resources 1200 shown in FIG. 12 is for illustration only.

In one embodiment, as shown in FIG. 12, a UE is configured to receive a burst of non-zero power (NZP) CSI-RS resource(s), referred to as CSI-RS burst for brevity, within B time slots comprising a measurement window, where B≥1. The B time slots can be accordingly to at least one of the following examples.

In one example, the B time slots are evenly/uniformly spaced with an inter-slot spacing d.

In one example, the B time slots can be non-uniformly spaced with inter-slot spacing $e_1=d_1$, $e_2=d_2-d_1$, $e_3=d_3-d_2$, . . . , so on, where $e_i \neq e_j$ for at least one pair (i,j) with i≠j.

The UE receives the CSI-RS burst, estimates the B instances of the DL channel measurements, and uses the channel estimates to obtain the Doppler component(s) of the DL channel. The CSI-RS burst can be linked to (or associated with) a single CSI reporting setting (e.g., via higher layer parameter CSI-ReportConfig), wherein the corresponding CSI report includes an information about the Doppler component(s) of the DL channel.

It may assume that $h_t$ is the DL channel estimate based on the CSI-RS resource(s) received in time slot $t \in \{0, 1, \ldots, B-1\}$. When the DL channel estimate in slot t is a matrix $G_t$ of size $N_{Rx} \times N_{Tx} \times N_{Sc}$, then $h_t = \mathrm{vec}(G_t)$, where $N_{Rx}$, $N_{Tx}$, and $N_{Sc}$ are number of receive (Rx) antennae at the UE, number of CSI-RS ports measured by the UE, and number of subcarriers in frequency band of the CSI-RS burst, respectively. The notation vec(X) is used to denote the vectorization operation wherein the matrix X is transformed into a vector by concatenating the elements of the matrix in an order, for example, 1→2→3→ and so on, implying that the concatenation starts from the first dimension, then moves second dimension, and continues until the last dimension. Let $H_B=[h_0\ h_1\ \ldots\ h_{B-1}]$ be a concatenated DL channel. The Doppler component(s) of the DL channel can be obtained based on $H_B$. For example, $H_B$ can be represented as $$C\Phi^H = \sum_{s=0}^{N-1} c_s \phi_s^H$$

where $\phi=[\phi_0\ \phi_1\ \ldots\ \phi_{N-1}]$ is a Doppler domain (DD) basis matrix whose columns comprise basis vectors, $C=[c_0\ c_1\ \ldots\ c_{N-1}]$ is a coefficient matrix whose columns comprise coefficient vectors, and N<B is the number of DD basis vectors. Since the columns of $H_B$ are likely to be correlated, a DD compression can be achieved when the value of N is small (compared to the value of B). In this example, the Doppler component(s) of the channel is represented by the DD basis matrix Φ and the coefficient matrix C.

The details of the CSI-RS bursts can be according to as described in U.S. patent application Ser. No. 17/689,838, which is incorporated by reference in its entirety herein.

When there are multiple TRPs/RRHs ($N_{RRH}$>1), the UE can be configured to measure the CSI-RS burst(s) according to at least one of the following examples.

In one example, the UE is configured to measure $N_{RRH}$ CSI-RS bursts, one from each TRP/RRH. The $N_{RRH}$ CSI-RS bursts can be overlapping in time (i.e., measured in same time slots). Or they can be staggered in time (i.e., measured in different time slots). Whether overlapping or staggered can be determined based on configuration. It can also depend on the total number of CSI-RS ports across RRHs/TRPs. When the total number of ports is small (e.g., <=32), they can overlap, otherwise (>32), they are staggered. The number of time instances B can be the same for all of the $N_{RRH}$ bursts. Or the number B can be the same or different across bursts (or TRPs/RRHs).

In one example, each CSI-RS burst corresponds to a semi-persistent (SP) CSI-RS resource. The SP CSI-RS resource can be activated or/and deactivated based on a MAC CE or/and DCI based signaling. The rest of the details can be as described in the U.S. patent application Ser. No. 17/689,838 as incorporated by reference herein.

In one example, each CSI-RS burst corresponds to a group of B≥1 aperiodic (Ap) CSI-RS resources. The Ap-CSI-RS resources can be triggered via a DCI with slot offsets such that they can be measured in B different time slots. The rest of the details can be as described in the U.S. patent application Ser. No. 17/689,838 as incorporated by reference herein.

In one example, each CSI-RS burst corresponds to a periodic (P) CSI-RS resource. The P-CSI-RS resource can be configured via higher layer. The first measurement instance (time slot) and the measurement window of the CSI-RS burst (from the P-CSI-RS resource) can be fixed, or configured. The rest of the details can be as described in the U.S. patent application Ser. No. 17/689,838 as incorporated by reference herein.

In one example, a CSI-RS burst can either be a P-CSI-RS, or SP-CSI-RS or Ap-CSI-RS resource.

In one example, the time-domain behavior (P, SP, or Ap) of $N_{RRH}$ CSI-RS bursts is the same.

In one example, the time-domain behavior of $N_{RRH}$ CSI-RS bursts can be the same or different.

In one example, the UE is configured to measure $K \geq N_{RRH}$ CSI-RS bursts, where $$K = \sum_{r=1}^{N_{RRH}} K_r$$

and $K_r$ is a number of CSI-RS bursts associated with RRH/TRP r, where $r \in \{1, \ldots, N_{RRH}\}$. Each CSI-RS burst is according to at least one of the examples as mentioned in the present disclosure. When $K_r>1$, multiple CSI-RS bursts are linked to (or associated with) a CSI reporting setting, i.e., the UE receives the $N_r$ CSI-RS bursts, estimates the DL channels, and obtains the Doppler component(s) of the channel using all of the $N_r$ CSI-RS bursts. The rest of the details can be as described in the U.S. patent application Ser. No. 17/689,838 as incorporated by reference herein.

In one example, the UE is configured to measure one CSI-RS burst across all of $N_{RRH}$ TRPs/RRHs. Let P be a number of CSI-RS ports associated with the NZP CSI-RS resource measured via the CSI-RS burst. The CSI-RS burst is according to at least one of the examples mentioned in the present disclosure. The total of P ports can be divided into $N_{RRH}$ groups/subsets of ports and one group/subset of ports is associated with (or corresponds to) a TRP/RRH. Then, $$P=\sum_{r=1}^{N_{RRH}}$$

$P_r$ and $P_r$ is a number of CSI-RS ports in the group/subset of ports associated with RRH/TRP r.

In one example, in each of the B time instances, a UE is configured to measure all groups/subsets of ports, i.e., in each time instance within the burst, the UE measures all of P ports (or $N_{RRH}$ groups/subsets of ports).

In one example, a UE is configured to measure subsets/groups of ports across multiple time instances, i.e., in each time instance within the burst, the UE measures a subset of P ports or a subset of groups of ports (RRHs/TRPs).

In one example, in each time instance, the UE measures only one group/subset of ports (1 TRP per time instance). In this case, $B=N_{RRH}\times C$ or $B\geq N_{RRH}\times C$, where C is a number of measurement instances for each TRP/RRH.

In one example, the UE is configured to measure one half of the port groups in a time instance, and the remaining half in another time instance.

In one example, the two time instances can be consecutive, for example, the UE measures one half of port groups in even-numbered time instances, and the remaining half in the odd-numbered time instances.

In one example, a first half of the time instances $$\left(\text{e.g., } 0, 1, \ldots, \frac{B}{2}-1\right)$$

is configured to measure one half of the port groups, and the second half of the time instances $$\left(\text{e.g., } \frac{B}{2}, \ldots B-1\right)$$

is configured to measure the remaining half of the port groups.

In one example, the UE is configured to measure multiple CSI-RS bursts, where each burst is according to at least one of the examples mentioned in the present disclosure. Multiple CSI-RS bursts are linked to (or associated with) a CSI reporting setting, i.e., the UE receives multiple CSI-RS bursts, estimates the DL channels, and obtains the Doppler component(s) of the channel using all of multiple CSI-RS bursts.

Figure 13:
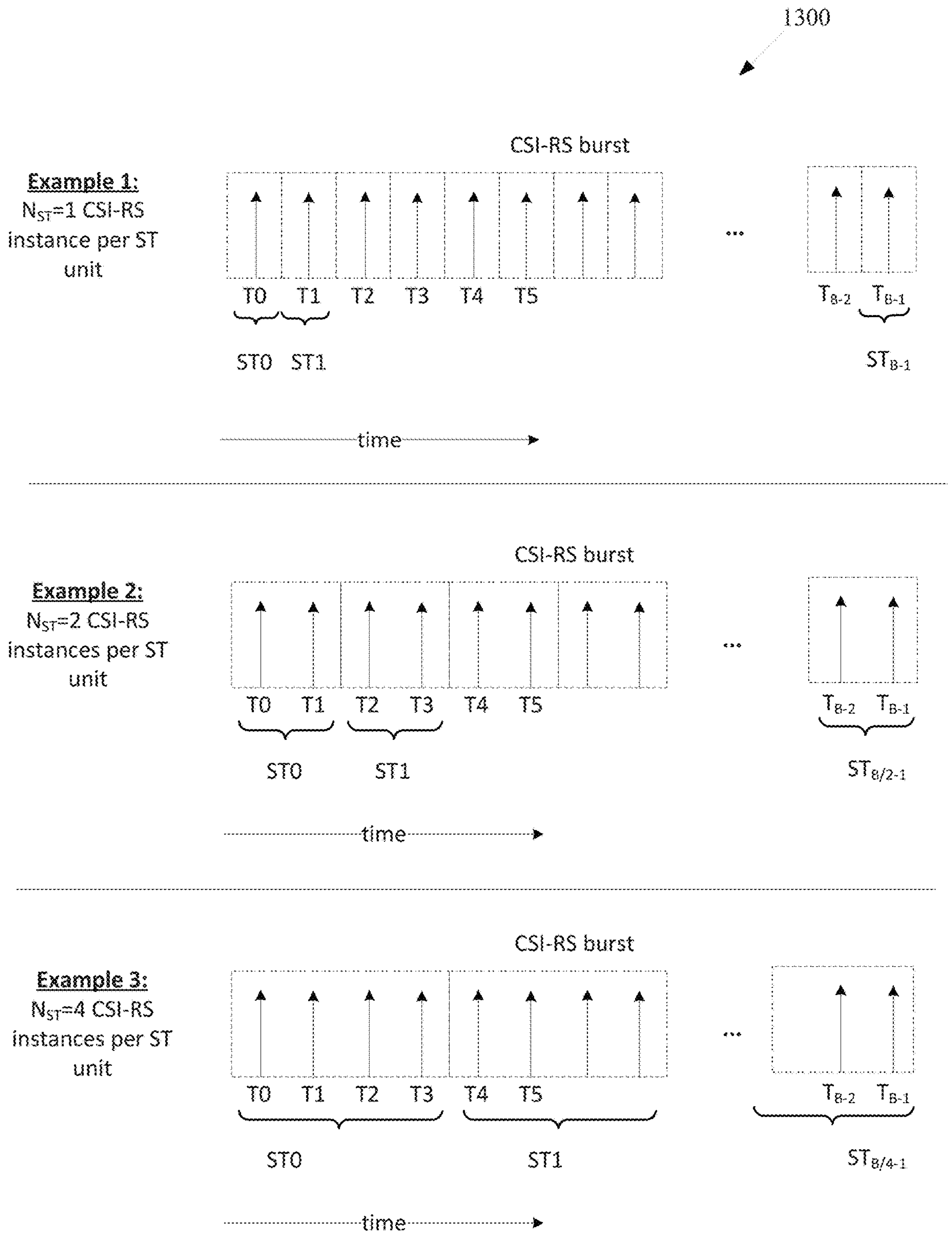
FIG. 13 illustrates an example of ST units according to embodiments of the present disclosure.

FIG. 13 illustrates an example of ST units 1300 according to embodiments of the present disclosure. An embodiment of the ST units 1300 shown in FIG. 13 is for illustration only.

Let $N_4$ be the length of the DD basis vectors $\{\phi_s\}$, e.g., each basis vector is a length $N_4\times 1$ column vector.

In one embodiment, a UE is configured to determine a value of $N_4$ based on the value B (number of CSI-RS instances) in a CSI-RS burst and components across which the DD compression is performed, where each component corresponds to one or multiple time instances within the CSI-RS burst. In one example, $N_4$ is fixed (e.g., $N_4$=B) or configured (e.g., via RRC or MAC CE or DCI) or reported by the UE (as part of the CSI report). In one example, the B CSI-RS instances can be partitioned into sub-time (ST) units (instances), where each ST unit is defined as (up to) $N_{ST}$ contiguous time instances in the CSI-RS burst. In this example, a component for the DD compression corresponds to a ST unit.

Three examples of the ST units are shown in FIG. 13. In the first example, each ST unit comprises $N_{ST}=1$ time instance in the CSI-RS burst. In the second example, each ST unit comprises $N_{ST}=2$ contiguous time instances in the CSI-RS burst. In the third example, each ST unit comprises $N_{ST}=4$ contiguous time instances in the CSI-RS burst.

The value of $N_{ST}$ can be fixed (e.g., $N_{ST}=1$ or 2 or 4) or indicated to the UE (e.g., via higher layer RRC or MAC CE or DCI based signaling) or reported by the UE (e.g., as part of the CSI report). The value of $N_{ST}$ (fixed or indicated or reported) can be subject to a UE capability reporting. The value of $N_{ST}$ can also be dependent on the value of B (e.g., one value for a range of values for B and another value for another range of values for B).

The details of the sub-time units can be according as described in U.S. patent application Ser. No. 17/701,442, which is incorporated by reference in its entirety herein.

When there are multiple TRPs/RRHs ($N_{RRH}>1$), the UE can be configured to determine a value of $N_4$ according to at least one of the following examples.

In one example, a value of $N_4$ is the same for all TRPs/RRHs.

In one example, a value of $N_4$ can be the same or different across TRPs/RRHs.

Figure 14:
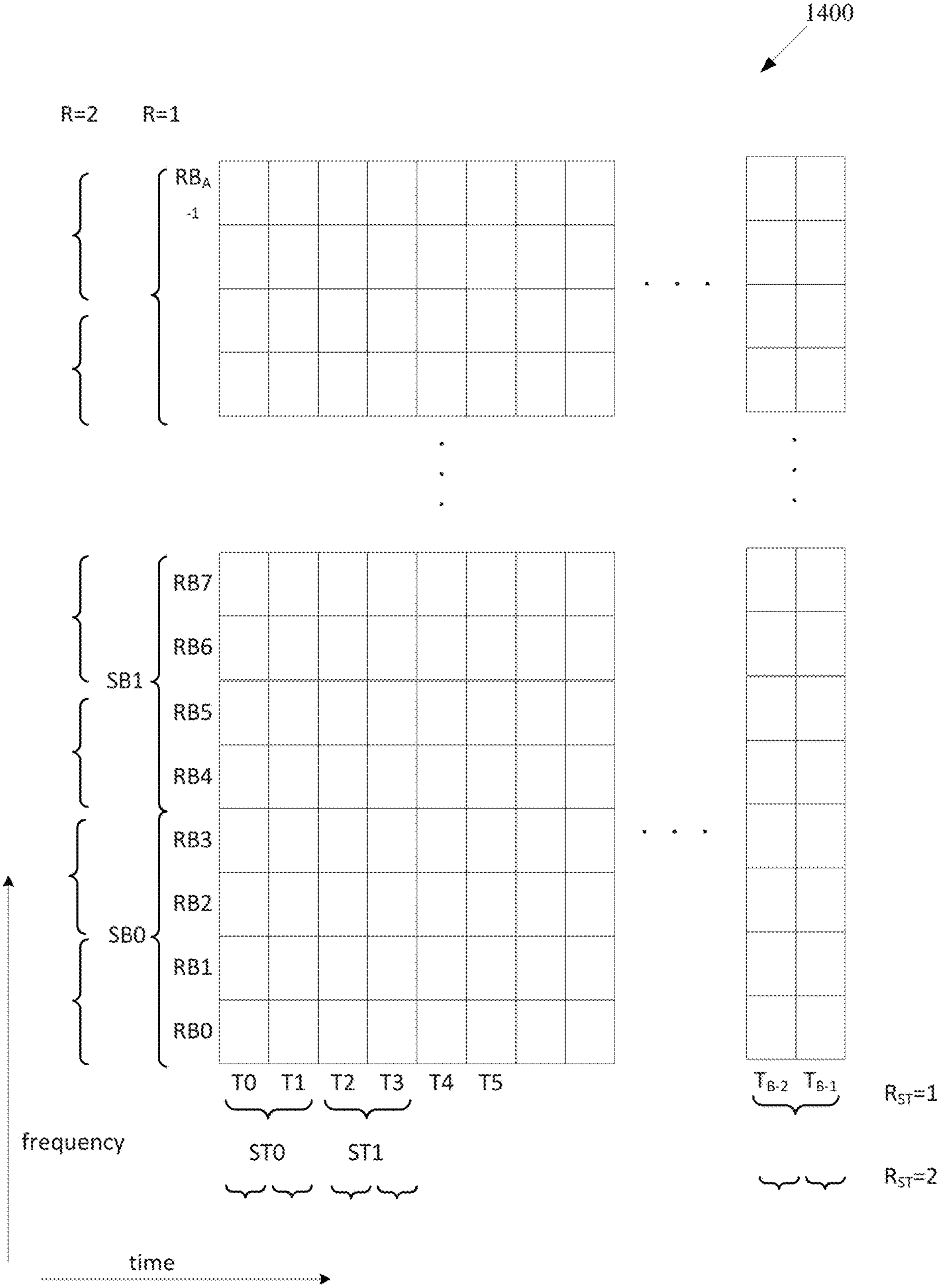
FIG. 14 illustrates an example of resource block (RB) allocations for sub-time (ST) units according to embodiments of the present disclosure.

FIG. 14 illustrates an example of RB allocations for ST 1400 according to embodiments of the present disclosure. An embodiment of the RB allocations for ST 1400 shown in FIG. 14 is for illustration only.

In one embodiment, a UE is configured with J≥1 CSI-RS bursts (as illustrated earlier in the disclosure) that occupy a frequency band and a time span (duration), wherein the frequency band comprises A RBs, and the time span comprises B time instances (of CSI-RS resource(s)). When J>1, the A RBs or/and B time instances can be aggregated across J CSI-RS bursts. In one example, the frequency band equals the CSI reporting band, and the time span equals the number of CSI-RS resource instances (across J CSI-RS bursts), both can be configured to the UE for a CSI reporting, which can be based on the DD compression.

The UE is further configured to partition (divide) the A RBs into subbands (SBs) or/and the B time instances into sub-times (STs). The partition of A RBs can be based on a SB size value $N_{SB}$, which can be configured to the UE (as illustrated in 3GPP standard specification). The partition of B time instances can be based either a ST size value $N_{ST}$ or an r value, as described in this disclosure (cf. embodiment as mentioned in the present disclosure). An example is illustrated in FIG. 14, where RB0, RB1, . . . , $RB_{A-1}$ comprise A RBs, $T_0, T_1, \ldots, T_{B-1}$ comprise B time instances, the SB size $N_{SB}$=4, and the ST size $N_{ST}$=2.

When there are multiple TRPs/RRHs ($N_{RRH}$>1), the UE can be configured to determine subbands (SBs) or/and sub-times (STs) according to at least one of the following examples.

In one example, both subbands (SBs) or/and sub-times (STs) are the same for all TRPs/RRHs.

In one example, subbands (SBs) are the same for all TRPs/RRHs, but sub-times (STs) can be the same or different across RRHs/TRPs.

In one example, subtimes (STs) are the same for all TRPs/RRHs, but subbands (SBs) can be the same or different across RRHs/TRPs.

In one example, both subtimes (STs) and subbands (SBs) can be the same or different across RRHs/TRPs.

The CSI reporting is based on channel measurements (based on CSI-RS bursts) in three dimensions (3D): the first dimension corresponds to SD comprising $P_{CSIRS}$ CSI-RS antenna ports (in total across all of $N_{RRH}$ RRHs/TRPs), the second dimension corresponds to FD comprising $N_3$ FD units (e.g., SB), and the third dimension corresponds to DD comprising $N_4$ DD units (e.g., ST). The 3D channel measurements can be compressed using basis vectors (or matrices) similar to the Rel. 16 enhanced Type II codebook. Let $W_1$, $W_f$, and $W_d$ respectively denote basis matrices whose columns comprise basis vectors for SD, FD, and DD.

In one embodiment, the DD compression (or DD component or $W_d$ basis) can be turned OFF/ON from the codebook. When turned OFF, $W_d$ can be fixed (hence not reported), e.g., $W_d$=1 (scalar 1) or $W_d$=[1, . . . , 1] (all-one vector) or $$W_d = \frac{1}{n}[1, \ldots, 1]$$

(all-one vector) or $$W_d = I = \begin{bmatrix} 1 & 0 & 0 \\ 0 & \ddots & 0 \\ 0 & 0 & 1 \end{bmatrix}$$

(identity matrix), where n is a scaling factor (e.g., n=$N_4$) or $W_d$=$h_{d*}$=

$$\left[\phi_1^{(d^*)}\ \phi_1^{(d^*)}\ \ldots\ \phi_{N_4-1}^{(d^*)}\right],$$

where d* is an index of a fixed DD basis vector $h_{d*}$. In one example, d*=0. In one example, when the DD basis vectors comprise an orthogonal DFT basis set, $h_{d*}$ is a DD basis vector which corresponds to the DC component. When turned ON, $W_d$ (DD basis vectors) is reported.

In one example, $W_d$ is turned OFF/ON via an explicit signaling, e.g., an explicit RRC parameter.

In one example, $W_d$ is turned OFF/ON via a codebook parameter. For example, similar to M=1 in Rel.17, when N=1 is configured, $W_d$ is turned OFF, and when a value N>1 is configured, $W_d$ is turned ON. Here, N denotes a number of DD basis vectors comprising columns of $W_d$.

In one example, the UE reports whether the DD component is turned OFF (not reported) or ON (reported). This reporting can be via a dedicated parameter (e.g., new UCI/CSI parameter). Or this reporting can be via an existing parameter (e.g., PMI component). A two-part UCI (cf. Rel. 15 NR) can be reused wherein the information whether $W_d$ is turned OFF/ON is included in UCI part 1.

In one example, $W_d$ is turned OFF/ON depending on the codebookType. When the codebookType is regular Type II codebook (similar to Rel 16 Type II codebook), $W_d$ is turned ON, and when the codebookType is Type II port selection codebook (similar to Rel 17 Type II codebook), $W_d$ is turned ON/OFF.

In one embodiment, a UE is configured with a CSI reporting based on a codebook, where the codebook comprises three bases (SD, FD, and DD/TD), and has a structure such that precoder for layer l is given by: $W_l=W_1\tilde{W}_2(W_{f,d})^H$ where: (1) $W_1$ includes SD basis vectors; (2) $W_{f,d}$ includes FD basis vectors and TD/DD basis vectors; and (3) $\tilde{W}_2$ is a coefficient matrix.

Let the length of each TD/DD basis vector be $N_4$, and the number of TD/DD basis vectors be Q. In one example, $N_4$ is configured, e.g., via higher-layer (RRC) signalling. In one example, Q is configured via RRC, or reported by the UE (e.g., as part of CSI report). In one example, the legacy (Rel. 16 enhanced Type II or Rel. 17 further enhanced Type II codebook) is used for reporting $W_1$, $W_f$ (for each layer), and $\tilde{W}_2$ (for each layer).

In one example, at least one of the following examples is used/configured regarding $W_{f,d}$.

In one example, $W_{f,d}=W_f\otimes I$, hence $W_l=W_1\tilde{W}_2(W_f\otimes I)^H$, where the notation $\otimes$ is used for the Kronecker product. Note that when I is z×z identity matrix, then $W_f\otimes I$ implies that $W_f$ is repeated z times. Therefore, $=W_1\tilde{W}_2(W_f\otimes I)^H$ corresponds to one $W_1$, one $W_f$, and z number of $W_2$ reports. In one example, z corresponds to number of TD/DD units. In one example, z corresponds to value of $N_4$ (i.e., z=$N_4$). In one example, the legacy (Rel. 16 enhanced Type II or Rel. 17 further enhanced Type II codebook) is used for reporting one $W_1$, one $W_f$ (for each layer), and multiple $W_2$ (for each layer).

In one example, $W_{f,d}=W_f\otimes W_d$, hence $W_l=W_1\tilde{W}_2(W_f\otimes W_d)^H$. In one example, $W_d$ comprises orthogonal DFT vectors as columns. The columns of the $W_d$ correspond to the DD basis vectors.

In one example, $W_{f,d}$ is according to example I.1.1.1 or example I.1.1.2 based on a condition on the value of $N_4$. For example: (1) for $N_4$≤x, $W_{f,d}$ is according to example mentioned in the present disclosure and (2) for $N_4$>x, $W_{f,d}$ is according to example I.1.1.2. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has an oversampling or rotation factor ($O_4$).

In one example, $O_4$=4 or 1 is fixed. In one example, $O_4$ is identical (the same) for different SD components. In one example, $O_4$ is different for different SD components.

In one example, x is fixed, e.g., x=1 or x=2.

In one example, x is configured, e.g., via higher layer (RRC) or MAC CE or DCI (e.g., CSI request field triggering an Aperiodic CSI report).

In one example, x is reported by the UE, e.g., the UE reports the value of x via UE capability reporting, or via CSI report.

When x=1, the condition is equivalent to the following: (1) for $N_4$=1, $W_{f,d}$ is according to examples mentioned in the present disclosure. In this case, since I=1, $W_l=W_1\tilde{W}_2(W_f)^H$, i.e., there is no DD/TD basis, or it is replaced with a scalar value 1. In this case, the PMI reporting can be according to legacy codebook (Rel. 16 enhanced Type II or Rel. 17 further enhanced Type II codebook) and (2) for $N_4>1$, $W_{f,d}$ is according to examples mentioned in the present disclosure. In one example, $W_d$ is an orthogonal DFT basis matrix commonly selected for all SD/FD bases reusing the legacy $W_1$ and $W_f$ (Rel. 16 enhanced Type II or Rel. 17 further enhanced Type II codebook). In one example, DFT vectors for DD basis has an oversampling or rotation factor ($O_4$). In one example, $O_4=4$ or 1 is fixed. In one example, $O_4$ is identical (the same) for different SD components. In one example, $O_4$ is different for different SD components. In one example, only Q (denoting the number of selected DD basis vectors or columns of $W_d$)>1 is allowed, i.e., the UE is expected to be configured with Q>1 (e.g., Q=2 or 3 or . . . ), or the UE is not expected to be configured with Q=1.

In one example, at least one of the following examples is used/configured regarding the value of $N_4$.

In one example, the set of supported values for $N_4$ includes $N_4=1$. When $N_4=1$, the $W_{f,d}$ is according to example mentioned in the present disclosure. In particular, since I=1, $W_l=W_1\tilde{W}_2(W_f)^H$, i.e., there is no DD/TD basis, or it is replaced with a scalar value 1. In this case, the PMI reporting can be according to legacy codebook (Rel. 16 enhanced Type II or Rel. 17 further enhanced Type II codebook).

In one example, the set of supported values for $N_4$ does not include $N_4=2$. Or, the UE is not expected to be configured with $N_4=2$. Or the UE is expected to be configured with a value of $N_4\neq 2$.

In one example, the set of supported values for $N_4$ includes $N_4=2$.

In one example, when $N_4=2$, the $W_{f,d}$ is according to example mentioned in the present disclosure, implying the DD basis is a 2×2 identity matrix I. That is, two $\tilde{W}_2$ are reported (corresponding to 2 TD units) for each layer, in addition to one $W_1$ and one $W_f$ for each layer.

In one example, when $N_4=2$, the $W_{f,d}$ is according to example mentioned in the present disclosure, implying the DD basis is a orthogonal DFT matrix $W_d$.

In one example, only Q=1 is supported (or can be configured) when $N_4=2$. Or the UE is expected to be configured with Q=1 when $N_4=2$ is configured. Or the UE is not expected to be configured with Q=2 when $N_4=2$ is configured.

In one example, only Q=2 is supported (or can be configured) when $N_4=2$. Or the UE is expected to be configured with Q=2 when $N_4=2$ is configured. Or the UE is not expected to be configured with Q=1 when $N_4=2$ is configured.

In one example, only Q=1 or only Q=2 or both Q=1,2 can be configured to a UE subject to the UE capability reporting about the value of Q or/and $N_4$ from the UE.

In one example, when $N_4=2$, then one of examples mentioned in the present disclosure can be used/configured regarding the value of Q or/and $W_{f,d}$. Or, when $N_4=2$, the UE is not expected to configure with Q=1 and can be configured with Q=2 (e.g., example mentioned in the present disclosure) or the identity DD basis (e.g., example mentioned in the present disclosure).

In one example, the set of supported values for $N_4$ includes $N_4=3$. In one example, when $N_4=3$, the $W_{f,d}$ is according to example I.1.1.2, implying the DD basis is a orthogonal DFT matrix $W_d$. In one example, only Q=1,2 is supported (or can be configured) when $N_4=3$. Or the UE is expected to be configured with Q=1 or 2 when $N_4=3$ is configured. Or the UE is not expected to be configured with Q=3 when $N_4=3$ is configured. In one example, only Q>1 (e.g., Q=2 or 3) is supported (or can be configured) when $N_4=3$. Or the UE is expected to be configured with Q=2 or 3 when $N_4=3$ is configured. Or the UE is not expected to be configured with Q=1 when $N_4=3$ is configured.

In one example, the set of supported values for $N_4$ includes $N_4=y$, where y≥3 (i.e, {3, 4, . . . }). In one example, when $N_4=y$, the $W_{f,d}$ is according to example I1.1.2, implying the DD basis is a orthogonal DFT matrix $W_d$. In one example, only Q=1, y−1 is supported (or can be configured) when $N_4=y$. Or the UE is expected to be configured with Q=1, 2, . . . or y−1 when $N_4=y$ is configured. Or the UE is not expected to be configured with Q=y when $N_4=y$ is configured. In one example, only Q>1 (e.g., Q=2 or 3 or . . . ) is supported (or can be configured) when $N_4=y$. Or the UE is expected to be configured with Q=2 or 3 or . . . when $N_4=3$ is configured. Or the UE is not expected to be configured with Q=1 when $N_4=y$ is configured.

In one example, the set of supported values for $N_4$ includes {1,2}. When $N_4=1$, the $W_{f,d}$ is according to example mentioned in the present disclosure. When $N_4=2$, the $W_{f,d}$ is according to examples as mentioned in the present disclosure.

In one example, the set of supported values for $N_4$ includes {1,3} and does not include 2. That is, $N_4=2$ is not supported. Or the UE is not expected to be configured with $N_4=2$. When $N_4=1$, the $W_{f,d}$ is according to examples as mentioned in the present disclosure. When $N_4=3$, the $W_{f,d}$ is according to examples as mentioned in the present disclosure.

In one example, the set of supported values for $N_4$ includes S or is equal to S.

In one example, S={1, 2}.

In one example, S={1, 3}.

In one example, S={2, 3}.

In one example, S={1, 2, 3}.

In one example, S={1, 2, 4}.

In one example, S={1, 3, 4}.

In one example, S={2, 3, 4}.

In one example, S={1, 2, 3, 4}.

In one example, S={1, 2, 3, 4, 8}.

In one example, S={1, 2, 3, 4, 8, 16}.

In one example, S={1, 2, 3, 4, 8, 16, 32}.

In one example, S={1, 3, 4, 8}.

In one example, S={1, 3, 4, 8, 16}.

In one example, S={1, 3, 4, 8, 16, 32}.

In one example, S={1, 4, 8}.

In one example, S={1, 4, 8, 16}.

In one example, S={1, 4, 8, 16, 32}.

In one example, at least one of the following examples is used/configured regarding the value of Q.

In one example, the set of supported values for Q includes Q=1. When Q=1, the $W_{f,d}$ is according to examples as mentioned in the present disclosure. In particular, since I=1, $W_l=W_1\tilde{W}_2(W_f)^H$, i.e., there is no DD/TD basis, or it is replaced with a scalar value 1 or an all-one vector or an identity matrix. In this case, the PMI reporting can be according to legacy codebook (Rel. 16 enhanced Type II or Rel. 17 further enhanced Type II codebook). In one example, the number of TD/DD unit is 1. In one example, Q=1 corresponds to a wide-time reporting, i.e., the PMI (precoding matrix) is the same for all TD/DD units, or the number of PMI or precoding matrix in TD is 1. In one example, such PMI reporting is regardless of the $N_4$ values (whether 1 or >1).

In one example, the set of supported values for Q does not include Q=1 (i.e., only Q>1 is supported or can be configured). Or the UE is not expected to be configured with Q=1. Or the UE is expected to be configured with a value of Q>1 (e.g., Q=2 or 3 or . . . ).

In one example, the set of supported values for Q includes Q=2. When Q=2, there is DD/TD compression and the $W_{f,d}$ is according to examples as mentioned in the present disclosure. The value of $N_4$ is either ≥2 or ≥3. In one example, $N_4$=2 is not supported when Q=2, i.e., the UE is not expected to be configured with Q=2 and $N_4$=2. That is, $N_4$≥3 when Q=2.

In one example, the set of supported values for Q does not include Q=2. Or the UE is not expected to be configured with Q=2. Or the UE is expected to be configured with a value of Q≠2.

In one example, the set of supported values for Q includes Q=q where q≥3 (i.e, {3, 4, . . . }). When Q=q, there can be DD compression and the $W_{f,d}$ is according to example I.1.1.2, implying the DD basis is a orthogonal DFT matrix $W_d$. In one example, only Q=q=1, . . . , y−1 is supported (or can be configured) when $N_4$=y. Or the UE is expected to be configured with Q=q=1, 2, . . . or y−1 when $N_4$=y is configured. Or the UE is not expected to be configured with Q=y when $N_4$=y is configured. In one example, only Q=q=2, . . . , y−1 is supported (or can be configured) when $N_4$=y. Or the UE is expected to be configured with Q=q=2, . . . or y−1 when $N_4$=y is configured. Or the UE is not expected to be configured with Q=1 or y when $N_4$=y is configured.

In one example, the set of supported values for Q includes {1, 2}. When Q=1, the $W_{f,d}$ is according to examples as mentioned in the present disclosure. When Q=2, the $W_{f,d}$ is according to example as mentioned in the present disclosure (or its sub-example).

In one example, the set of supported values for Q includes {1, 3} and does not include 2. That is, Q=2 is not supported. Or the UE is not expected to be configured with Q=2. When Q=1, the $W_{f,d}$ is according to examples as mentioned in the present disclosure. When Q=3, the $W_{f,d}$ is according to examples as mentioned in the present disclosure(or its sub-example).

In one example, the set of supported values for Q includes T or is equal to T or is included in (or is a subset of) T.

In one example, T={1, 2}.

In one example, T={1, 3}.

In one example, T={2, 3}.

In one example, T={1, 2, 3}.

In one example, T={1, 2, 4}.

In one example, T={1, 3, 4}.

In one example, T={2, 3, 4}.

In one example, T={1, 2, 3, 4}.

In one example, T={2, 3, . . . , $N_4$−1}.

In one example, at least one of the following examples is used/configured regarding the value of Q.

In one example, $Q=\lceil qN_4 \rceil$ where q is a fraction (e.g., ¼, ½, ¾ etc.).

In one example, $Q=qN_4$ where q is a fraction (e.g., ¼, ½, ¾ etc.).

In one example, $Q=\lfloor qN_4 \rfloor$ where q is a fraction (e.g., ¼, ½, ¾ etc.).

In one example, $Q=\max(2, \lceil qN_4 \rceil)$ where q is a fraction (e.g., ¼, ½, ¾ etc.).

In one example, $Q=\max(2, qN_4)$ where q is a fraction (e.g., ¼, ½, ¾ etc.).

In one example, $Q=\max(2, \lfloor qN_4 \rfloor)$ where q is a fraction (e.g., ¼, ½, ¾ etc.).

In one example, $$Q = \left\lceil \frac{N_4}{s} \right\rceil$$

where s is an integer (e.g., 1, 2, 3 etc.).

In one example, $$Q = \frac{N_4}{s}$$

where s is an integer (e.g., 1, 2, 3 etc.).

In one example, $$Q = \left\lfloor \frac{N_4}{s} \right\rfloor$$

where s is an integer (e.g., 1, 2, 3 etc.).

In one example, the value q is fixed, e.g., $$q = \frac{1}{2}$$

In one example, the value q is reported by the UE (e.g., via UE capability information). In one example, the value q is configured (e.g., via higher layer RRC), e.g., from {⅛, ¼, ⅓, ½, ¾}.

In one example, the value s is fixed, e.g., s=2. In one example, the value s is reported by the UE (e.g., via UE capability information). In one example, the value s is configured (e.g., via higher layer RRC), e.g., from {2, 3, 4, 8}.

In one example, the maximum value of Q is limited to a value v. In one example, the value v is fixed, e.g., v=4. In one example, the value v is reported by the UE (e.g., via UE capability information). In this case, the value of Q min(v, w) where w is according to one of the following examples.

In one example, $w=\lceil qN_4 \rceil$ where q is a fraction (e.g., ¼, ½, ¾ etc.).

In one example, $w=qN_4$ where q is a fraction (e.g., ¼, ½, ¾ etc.).

In one example, $w=\lfloor qN_4 \rfloor$ where q is a fraction (e.g., ¼, ½, ¾ etc.).

In one example, $w=\max(2, \lceil qN_4 \rceil)$ where q is a fraction (e.g., ¼, ½, ¾ etc.).

In one example, $w=\max(2, qN_4)$ where q is a fraction (e.g., ¼, ½, ¾ etc.).

In one example, $w=\max(2, \lfloor qN_4 \rfloor)$ where q is a fraction (e.g., ¼, ½, ¾ etc.).

In one example, $$w = \left\lceil \frac{N_4}{s} \right\rceil$$

where s is an integer (e.g., 1, 2, 3 etc.).

In one example, $$w = \frac{N_4}{s}$$

where s is an integer (e.g., 1, 2, 3 etc.).

In one example, $$w=\left\lfloor\frac{N_4}{s}\right\rfloor$$

where s is an integer (e.g., 1, 2, 3 etc.).

In one embodiment, the precoders for υ layers are then given by:

$$W^{l}_{\ldots,t,u}=\frac{1}{\sqrt{N_1N_2\gamma_{t,u,l}}}\begin{bmatrix}\sum_{i=0}^{L-1}v_{m_1^{(i)},m_2^{(i)}}\sum_{f=0}^{M_v-1}\sum_{d=0}^{Q-1}y_{t,l}^{(f)}\phi_{u,l}^{(d)}x_{l,i,f,d}\\ \sum_{i=0}^{L-1}v_{m_1^{(i)},m_2^{(i)}}\sum_{f=0}^{M_v-1}\sum_{d=0}^{Q-1}y_{t,l}^{(f)}\phi_{u,l}^{(d)}x_{l,i+L,f,d}\end{bmatrix},$$

$$l=1,\ldots,v,$$

$$\gamma_{t,u,l}=\sum_{i=0}^{2L-1}\left|\sum_{f=0}^{M_v-1}\sum_{d=0}^{Q-1}y_{t,l}^{(f)}\phi_{u,l}^{(d)}x_{l,i,f,d}\right|^2$$

where: (1) $x_{l,i,f,d}$ is the coefficient (an element of $\tilde{W}_2$) associated with codebook indices (l,i,f,d), where i is a row index of $\tilde{W}_2$ and (f, d) determine the column index k of $\tilde{W}_2$. In one example, $$x_{l,i,f,d}=p^{(1)}_{l,\left\lfloor\frac{i}{L}\right\rfloor}p^{(2)}_{l,i,f,d}\varphi_{l,i,f,d}$$

similar to Rel. 16 enhanced Type II codebook (as illustrated in the 3GPP standard specification; (2)

$$v_{m_1^{(i)},m_2^{(i)}}$$

is a SD basis vector with index $$m_1^{(i)},\ m_2^{(i)};$$

(3)

$$y_{t,l}^{(f)}$$

is t-th entry of the FD basis vector with index f; and (4)

$$\phi_{u,l}^{(d)}$$

is u-th entry of the DD/TD basis vector with index d.

The rest of the details are the same as or are similar to Rel. 16 enhanced Type II codebook (as illustrated in 3GPP standard specification).

In one example, when $W_l=W_1\tilde{W}_2(W_f\otimes I)^H$, $$\phi_{u,l}^{(d)}=1$$

if u=d, and $$\phi_{u,l}^{(d)}=0$$

if u≠d. The DD/TD basis vector $h_{d,l}=[0\ \ldots\ 1\ \ldots\ 0]$ comprises a "1" at index u=d, and "0" at remaining index u≠d. The precoders at FD unit t and DD/TD unit u are given by:

$$W^{l}_{\ldots,t,u}=\frac{1}{\sqrt{N_1N_2\gamma_{t,u,l}}}\begin{bmatrix}\sum_{i=0}^{L-1}v_{m_1^{(i)},m_2^{(i)}}\sum_{f=0}^{M_v-1}y_{t,l}^{(f)}x_{l,i,f,u}\\ \sum_{i=0}^{L-1}v_{m_1^{(i)},m_2^{(i)}}\sum_{f=0}^{M_v-1}y_{t,l}^{(f)}x_{l,i+L,f,u}\end{bmatrix},\ l=1,\ldots,v,$$

$$\gamma_{t,u,l}=\sum_{i=0}^{2L-1}\left|\sum_{f=0}^{M_v-1}y_{t,l}^{(f)}x_{l,i,f,u}\right|^2.$$

In one example, when $W_l=W_1\tilde{W}_2(W_f\otimes W_d)^H$, $W_d$ comprises the DD/TD basis vectors given by $$h_{d,l}=\left[\phi_{0,l}^{(d)}\ \phi_{1,l}^{(d)}\ \cdots\ \phi_{N_4-l}^{(d)}\right],$$

d=0, 1, . . . , Q−1.}. In one example, the DD/TD basis vectors are oversampled (or rotated) orthogonal DFT vectors with the oversampling (rotation) factor $O_4$, and $$\phi_{u,l}^{(d)}=e^{j\frac{2\pi u n_{4,l}^{(d)}}{O_4N_4}}$$

and the Q DD/TD basis vectors are also identified by the rotation index $q_{4,l}\in\{0, 1, \ldots, O_4-1\}$. In one example, the DD/TD basis vectors are orthogonal DFT vectors with the oversampling (rotation) factor $O_4=1$, and $$\phi_{u,l}^{(d)}=e^{j\frac{2\pi u n_{4,l}^{(d)}}{N_4}}.$$

In one example, the same as examples as mentioned in the present disclosure except that the SD basis is replaced with a port selection (PS) basis, i.e., the 2L antenna ports vectors are selected from the $P_{CSIRS}$ CSIRS ports. The rest of the details are the same as in examples as mentioned in the present disclosure.

In one example, whether there is any selection in SD or not depends on the value of L. If $$L=\frac{P_{CSI-RS}}{2},$$

there is no need for any selection in SD (since all ports are selected), and when $$L<\frac{P_{CSI-RS}}{2},$$

the SD ports are selected (hence reported), where this selection is according to at least one of examples as mentioned in the present disclosure.

In one example, the SD basis is analogous to the $W_1$ component in Rel.15/16 Type II port selection codebook (as illustrated in 3GPP standard specification), wherein the $L_l$ antenna ports or column vectors of $A_l$ are selected by the index $q_1$ $$\in\left\{0, 1, \ldots, \left\lceil\frac{P_{CSI-RS}}{2d}\right\rceil-1\right\}$$

(this requires $$\left\lceil\log_2\left\lceil\frac{P_{CSI-RS}}{2d}\right\rceil\right\rceil \text{ bits}\Big), \text{ where } d \le \min\left(\frac{P_{CSI-RS}}{2}, L_l\right).$$

In one example, $d\in\{1,2,3,4\}$. To select columns of $A_l$, the port selection vectors are used, For instance, $a_i=v_m$, where the quantity $v_m$ is a $P_{CSI-RS}/2$-element column vector containing a value of 1 in element m mod $P_{CSI-RS}/2$ and zeros elsewhere (where the first element is element 0). The port selection matrix is then given by: $W_1=$ $$A_l=\begin{bmatrix} X & 0 \\ 0 & X \end{bmatrix} \text{ where } X=\begin{bmatrix} v_{q_1 d} & v_{q_1 d+1} & \ldots & v_{q_1 d+L_l-1} \end{bmatrix}.$$

The SD basis is selected either common (the same) for the two antenna polarizations or independently for each of the two antenna polarizations.

In one example, the SD basis selects $L_l$ antenna ports freely, i.e., the $L_l$ antenna ports per polarization or column vectors of $A_l$ are selected freely by the index $$q_1\in\left\{0, 1, \ldots, \binom{\frac{P_{CSI-RS}}{2}}{L_l}-1\right\}\left(\text{this requires }\left\lceil\log_2\binom{\frac{P_{CSI-RS}}{2}}{L_l}\right\rceil\text{ bits}\right).$$

To select columns of $A_l$, the port selection vectors are used, For instance, $a_i=v_m$, where the quantity $v_m$ is a $P_{CSI-RS}/2$-element column vector containing a value of 1 in element (m mod $P_{CSI-RS}/2$) and zeros elsewhere (where the first element is element 0). Let $\{x_0, x_1, \ldots, x_{L_l-1}\}$ be indices of selection vectors selected by the index $q_1$. The port selection matrix is then given by:

$$W_1=A_l=\begin{bmatrix} X & 0 \\ 0 & X \end{bmatrix}$$

where $X=[v_{x_0}\ v_{x_1} \ldots v_{x_{L_l-1}}]$.

The SD basis is selected either common (the same) for the two antenna polarizations or independently for each of the two antenna polarizations.

In one example, the SD basis selects $L_l$ antenna ports freely from $P_{CSI-RS}$ ports, i.e., the $L_l$ antenna ports or column vectors of $A_l$ are selected freely by the index $$q_1\in\left\{0, 1, \ldots, \binom{P_{CSI-RS}}{L_l}-1\right\}\left(\text{this requires }\left\lceil\log_2\binom{P_{CSI-RS}}{L_l}\right\rceil\text{ bits}\right).$$

To select columns of $A_l$, the port selection vectors are used, For instance, $a_i=v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{L_l-1}\}$ be indices of selection vectors selected by the index $q_l$. The port selection matrix is then given by:

$$W_1=A_l=\begin{bmatrix} X & 0 \\ 0 & X \end{bmatrix}$$

where $X=[v_{x_0}\ v_{x_1} \ldots v_{x_{L_l-1}}]$.

In one example, the SD basis selects $2L_l$ antenna ports freely from $P_{CSI-RS}$ ports, i.e., the $2L_l$ antenna ports or column vectors of $A_l$ are selected freely by the index $$q_1\in\left\{0, 1, \ldots, \binom{P_{CSI-RS}}{2L_l}-1\right\}\left(\text{this requires }\left\lceil\log_2\binom{P_{CSI-RS}}{2L_l}\right\rceil\text{ bits}\right).$$

To select columns of $A_1$, the port selection vectors are used, For instance, $a_i=v_m$, where the quantity $v_m$ is a $P_{CSI-RS}$-element column vector containing a value of 1 in element (m mod $P_{CSI-RS}$) and zeros elsewhere (where the first element is element 0). Let $\{x_0, x_1, \ldots, x_{2L_l-1}\}$ be indices of selection vectors selected by the index $q_1$. The port selection matrix is then given by:

$$W_1=A_l=\begin{bmatrix} X & 0 \\ 0 & X \end{bmatrix}$$

where $X=[v_{x_0}\ v_{x_1} \ldots v_{x_{2L_l-1}}]$.

Figure 15:
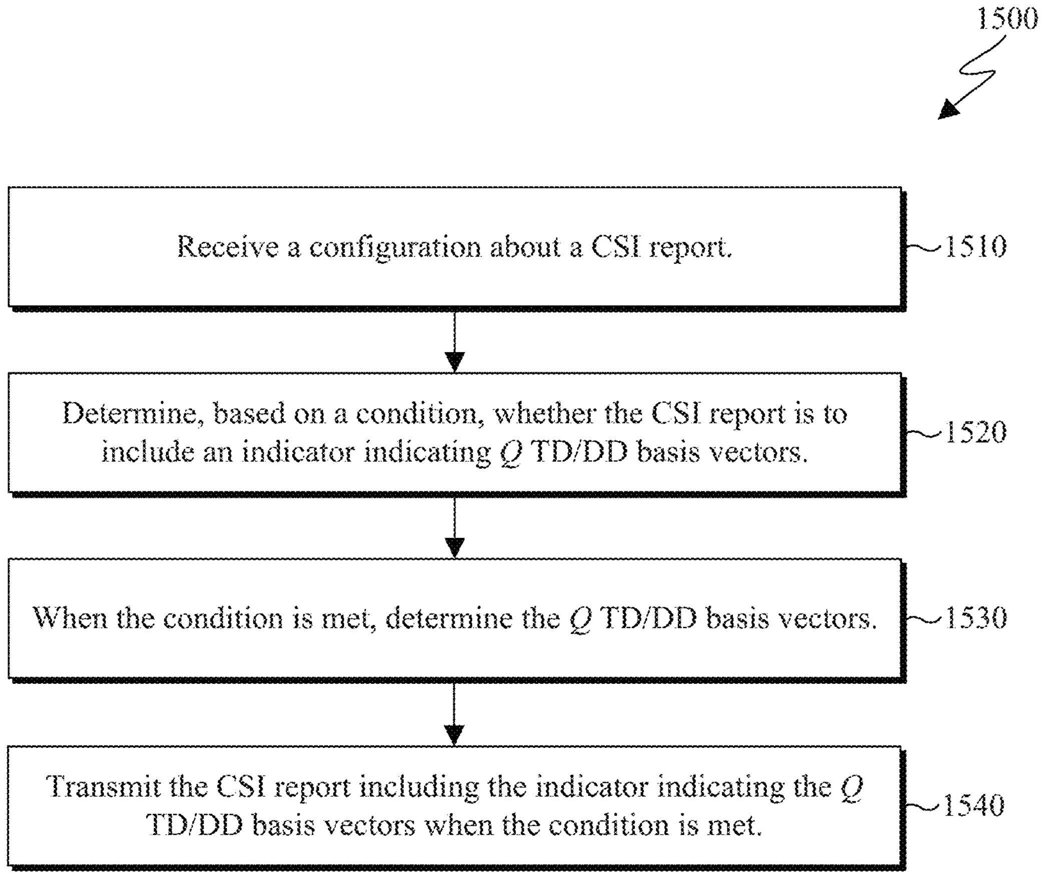
FIG. 15 illustrates an example method performed by a UE in a wireless communication system according to embodiments of the present disclosure.

FIG. 15 illustrates an example method 1500 performed by a UE in a wireless communication system according to embodiments of the present disclosure. The method 1500 of FIG. 15 can be performed by any of the UEs 111-116 of FIG. 1, such as the UE 116 of FIG. 3, and a corresponding method can be performed by any of the BSs 101-103 of FIG. 1, such as BS 102 of FIG. 2. The method 1500 is for illustration only and other embodiments can be used without departing from the scope of the present disclosure.

The method 1500 begins with the UE receiving a configuration about a CSI report (1510). For example, in 1510 the configuration includes a value of $N_4$ and a codebookType. The UE then determines, based on a condition, whether the CSI report is to include an indicator indicating Q TD/DD basis vectors (1520). For example, in 1520, whether the CSI report is to include an indicator indicating Q TD/DD basis vectors is determined based on the configuration for the CSI report and Q>1. In various embodiments, the condition is based on the codebookType. For example, when the codebookType is set to typeII-Doppler-r18, the condition is met, and when the codebookType is set to typeII-Doppler-PortSelection-r18, the condition is not met.

The UE then, when the condition is met, determines the Q TD/DD basis vectors (1530). For example, in 1530, the Q TD/DD basis vectors are determined based on the configuration for the CSI report and each of the Q TD/DD basis vectors has a length $N_4$ where $N_4\ge1$. In various embodiments, the condition is based on the value of $N_4$. For example, when $N_4>1$, the condition is met, and when $N_4=1$, the condition is not met. In various embodiments, the value of $N_4$ belongs to a set including {1,2,4,8}. In one example, the value of Q=2 when $N_4\in\{2,4,8\}$. The UE then transmits the CSI report including the indicator indicating the Q TD/DD basis vectors when the condition is met (1540).

In various embodiments, the UE further determines L vectors, each of length $P_{CSIRS}/2$, $M_v$ vectors, each of length $N_3$, and $2LM_vQ$ coefficients, $LM_vQ$ coefficients of the $2LM_vQ$ coefficients associated with two halves of $P_{CSIRS}$ ports, respectively. The UE then transmits the CSI report including indicators indicating the L vectors, the $M_v$ vectors, and an amplitude and phase of $K^{NZ}$ coefficients that are non-zero. Here, $N_3>1$, $K^{NZ}\leq 2LM_vQ$, and $P_{CSIRS}$ is a number of CSI-RS ports configured for the CSI report.

In various embodiments, when the condition is met, a precoder for layer l, $t\in\{0, 1, \ldots, N_3-1\}$, and $u\in\{0, 1, \ldots, N_4-1\}$ is given by $$W^l = \frac{1}{\sqrt{\gamma}}\begin{bmatrix} \sum_{i=0}^{L-1} v_{I^{(i)}} \sum_{f=0}^{M_v-1} \sum_{d=0}^{Q-1} y_{t,l}^{(f)} \phi_{u,l}^{(d)} x_{l,i,f,d} \\ \sum_{i=0}^{L-1} v_{I^{(i)}} \sum_{f=0}^{M_v-1} \sum_{d=0}^{Q-1} y_{t,l}^{(f)} \phi_{u,l}^{(d)} x_{l,i+L,f,d} \end{bmatrix},$$

and when the condition is not met, a precoder for layer l and $t\in\{0, 1, \ldots, N_3-1\}$ is given by $$W^l = \frac{1}{\sqrt{\gamma}}\begin{bmatrix} \sum_{i=0}^{L-1} v_{I^{(i)}} \sum_{f=0}^{M_v-1} y_{t,l}^{(f)} x_{l,i,f} \\ \sum_{i=0}^{L-1} v_{I^{(i)}} \sum_{f=0}^{M_v-1} y_{t,l}^{(f)} x_{l,i+L,f} \end{bmatrix}.$$

Here, the L vectors are $v_{I^{(i)}}$, i=0, 1, . . . , L−1;

$$I^{(i)} = (m_1^{(i)}, m_2^{(i)})$$

when the codebookType is set to typeII-Doppler-r18, where $$v_{m_1^{(i)}, m_2^{(i)}}$$

is a 2D DFT vector, $$m_1^{(i)} \text{ and } m_2^{(i)}$$

are indices of discrete Fourier transform (DFT) vectors in a first and a second dimensions, respectively, $$m_1^{(i)} \in \{0, 1, \ldots, N_1-1\}, m_2^{(i)} \in \{0, 1, \ldots, N_2-1\},$$

and $P_{CSIRS}=2N_1N_2$; $I^{(i)}=m^{(i)}$ when the codebookType is set to typeII-Doppler-PortSelection-r18, where $v_{m^{(i)}}$ is a $P_{CSI-RS}/2$-element port selection vector containing a value of 1 in element ($m^{(i)} \bmod P_{CSI-RS}/2$) and zeros elsewhere, where the first element is element 0; the $M_\upsilon$ vectors are $$g_{f,l} = [y_{0,l}^{(f)}\ y_{1,l}^{(f)}\ \ldots\ y_{N_3-1,l}^{(f)}],$$

f=0, 1 . . . , $M_\upsilon-1$; the Q vectors are $$h_{d,l} = [\phi_{0,l}^{(d)}\ \phi_{1,l}^{(d)}\ \ldots\ \phi_{N_4-1,l}^{(d)}],$$

d=0, 1, . . . , Q−1; the $2LM_\upsilon Q$ coefficients are $x_{l,i,f,d}$, i=0, 1, . . . , 2L−1, f=0, 1, . . . , $M_\upsilon-1$, and d=0, 1, . . . , Q−1; and $$\gamma = \frac{P_{CSIRS}}{2}\gamma_{t,u,l}$$

and $$\gamma_{t,u,l} = \sum_{i=0}^{2L-1} \left| \sum_{f=0}^{m_v-1} \sum_{d=0}^{Q-1} y_{t,l}^{(f)} \phi_{u,l}^{(d)} x_{l,i,f,d} \right|^2.$$

Any of the above variation embodiments can be utilized independently or in combination with at least one other variation embodiment.

Any of the above variation embodiments can be utilized independently or in combination with at least one other variation embodiment.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:

a processor; and a transceiver operably coupled to the processor, the transceiver configured to:

receive, from a base station, first information configuring a codebook for a channel state information (CSI) report, wherein the first information includes second information on a length of a doppler-domain (DD) basis vector ($N_4$); and transmit, to the base station, the CSI report, wherein, when the length of the DD basis vector ($N_4$) is one of 2, 4 or 8, the CSI report includes information on the DD basis vector ($N_4$) and a number of DD basis vectors (Q) for the CSI report is 2.

2. The UE of claim 1, wherein a type of the codebook is a type without a port selection.

3. The UE of claim 1, wherein:

when the length of the DD basis vector ($N_4$) is 1, the CSI report does not include the information on the DD basis vector ($N_4$), and a type of the codebook is a type with a port selection.

4. The UE of claim 1, wherein a value indicating the length of the DD basis vector ($N_4$) is configured via a radio resource control (RRC) message.

5. A base station (BS) comprising:
a transceiver configured to:
transmit, to a user equipment (UE), first information configuring a codebook for a channel state information (CSI) report, wherein the first information includes second information on a length of a doppler-domain (DD) basis vector ($N_4$); and
receive, from the UE, the CSI report,
wherein, when the length of the DD basis vector ($N_4$) is one of 2, 4 or 8, the CSI report includes information on the DD basis vector ($N_4$) and a number of DD basis vectors (Q) for the CSI report is 2.

6. The BS of claim 5, wherein a type of the codebook is a type without a port selection.

7. The BS of claim 5, wherein:
when the length of the DD basis vector ($N_4$) is 1, the CSI report does not include the information on the DD basis vector ($N_4$), and
a type of the codebook is a type with a port selection.

8. The BS of claim 5, wherein a value indicating the length of the DD basis vector ($N_4$) is configured via a radio resource control (RRC) message.

9. A method for operating a user equipment (UE), the method comprising:
receiving, from a base station, first information configuring a codebook for a channel state information (CSI) report, wherein the first information includes second information on a length of a doppler-domain (DD) basis vector ($N_4$); and
transmitting, to the base station, the CSI report,
wherein, when the length of the DD basis vector ($N_4$) is one of 2, 4 or 8, the CSI report includes information on the DD basis vector ($N_4$) and a number of DD basis vectors (Q) for the CSI report is 2.

10. The method of claim 9, wherein a type of the codebook is a type without a port selection.

11. The method of claim 9, wherein:
when the length of the DD basis vector ($N_4$) is 1, the CSI report does not include the information on the DD basis vector ($N_4$), and
a type of the codebook is a type with a port selection.

12. The method of claim 9, wherein a value indicating the length of the DD basis vector ($N_4$) is configured via a radio resource control (RRC) message.

* * * * *